US012700172B2

(12) United States Patent
Young et al.

(10) Patent No.: US 12,700,172 B2
(45) Date of Patent: Aug. 4, 2026

(54) DISPLAYING A REPRESENTATION OF A DIGITAL CARD WITH A VISUAL EFFECT

(71) Applicant: Apple Inc., Cupertino, CA (US)

(72) Inventors: Trevor W. Young, Livermore, CA (US); Andrez E. Aguayo, Culver City, CA (US); Antonio Allen, San Jose, CA (US); William D. Carpenter, Pacifica, CA (US); Flavio Mattos De Carvalho, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 18/821,942

(22) Filed: Aug. 30, 2024

(65) Prior Publication Data

US 2025/0378634 A1     Dec. 11, 2025

Related U.S. Application Data

(60) Provisional application No. 63/657,915, filed on Jun. 9, 2024.

(51) Int. Cl.
*G06T 15/80*          (2011.01)

(52) U.S. Cl.
CPC ................................... *G06T 15/80* (2013.01)

(58) Field of Classification Search
CPC ....................................................... G06T 15/80
See application file for complete search history.

(56)                References Cited

U.S. PATENT DOCUMENTS

| | | | |
|---|---|---|---|
| 3,586,261 | A | 6/1971 | Paine et al. |
| 4,516,207 | A | 5/1985 | Moriyama et al. |
| 5,802,208 | A | 9/1998 | Podilchuk et al. |
| 6,076,928 | A | 6/2000 | Fateh et al. |
| 6,212,548 | B1 | 4/2001 | Desimone et al. |
| 6,256,129 | B1 | 7/2001 | Kim et al. |
| 6,993,489 | B1 | 1/2006 | Miglautsch |
| 7,664,638 | B2 | 2/2010 | Cooper et al. |
| 8,510,217 | B1 | 8/2013 | Serowatka |
| 8,528,828 | B2 | 9/2013 | Fleischer et al. |
| 8,788,418 | B2 * | 7/2014 | Spodak ................ G06Q 20/105 705/41 |
| 8,827,153 | B1 | 9/2014 | Rhoades et al. |
| 8,959,360 | B1 | 2/2015 | Barra |
| 9,092,912 | B1 | 7/2015 | Walden |
| 9,117,242 | B1 | 8/2015 | Ellis et al. |
| 9,123,272 | B1 | 9/2015 | Baldwin et al. |
| 9,189,778 | B1 | 11/2015 | Sh. Al-Rashidi |

(Continued)

FOREIGN PATENT DOCUMENTS

| | | |
|---|---|---|
| AU | 2005256796 A1 | 1/2006 |
| AU | 2012200569 A1 | 2/2012 |

(Continued)

OTHER PUBLICATIONS

Notice of Allowance received for U.S. Appl. No. 18/821,090, mailed on Nov. 25, 2025, 9 pages.

(Continued)

*Primary Examiner* — Yassin Alata
(74) *Attorney, Agent, or Firm* — YHE Law LLP

(57)                ABSTRACT
The present disclosure generally relates to techniques for displaying a representation of a digital card with a visual effect, in accordance with some embodiments.

42 Claims, 20 Drawing Sheets

(56) References Cited

U.S. PATENT DOCUMENTS

| | | |
|---|---|---|
| 9,299,099 B1 | 3/2016 | Jayaram |
| 9,519,901 B1 | 12/2016 | Dorogusker |
| 9,607,418 B1 | 3/2017 | Hemminger |
| 9,760,871 B1 | 9/2017 | Pourfallah et al. |
| 10,032,100 B2 | 7/2018 | Mullen et al. |
| 10,223,631 B2 | 3/2019 | Mullen et al. |
| 10,255,545 B2 | 4/2019 | Mullen et al. |
| 10,354,175 B1 | 7/2019 | Vittimberga et al. |
| 11,055,593 B1 | 7/2021 | Sherif et al. |
| 11,113,875 B1 | 9/2021 | Monaghan et al. |
| 11,488,195 B1 | 11/2022 | Jacoby et al. |
| 2004/0006479 A1 | 1/2004 | Tanaka |
| 2004/0225609 A1 | 11/2004 | Greene |
| 2005/0131816 A1 | 6/2005 | Britto et al. |
| 2005/0210394 A1 | 9/2005 | Crandall et al. |
| 2005/0219223 A1 | 10/2005 | Kotzin et al. |
| 2005/0244059 A1 | 11/2005 | Turski |
| 2006/0092770 A1 | 5/2006 | Demas |
| 2006/0149546 A1 | 7/2006 | Runge et al. |
| 2006/0152487 A1 | 7/2006 | Grunnet-Jepsen et al. |
| 2007/0005569 A1 | 1/2007 | Hurst-Hiller et al. |
| 2007/0219901 A1 | 9/2007 | Garbow et al. |
| 2008/0231429 A1 | 9/2008 | Leonard et al. |
| 2008/0256466 A1 | 10/2008 | Salvador et al. |
| 2009/0005011 A1 | 1/2009 | Christie et al. |
| 2009/0031239 A1 | 1/2009 | Coleran et al. |
| 2009/0050687 A1 | 2/2009 | Kon et al. |
| 2009/0119678 A1 | 5/2009 | Shih et al. |
| 2009/0227296 A1 | 9/2009 | Kim |
| 2010/0001980 A1 | 1/2010 | Kim et al. |
| 2010/0064259 A1 | 3/2010 | Alexanderovitc et al. |
| 2010/0078472 A1 | 4/2010 | Lin et al. |
| 2010/0217808 A1 | 8/2010 | Benninger |
| 2011/0055735 A1 | 3/2011 | Wood et al. |
| 2011/0137776 A1 | 6/2011 | Goad et al. |
| 2011/0179126 A1 | 7/2011 | Wetherell et al. |
| 2011/0202834 A1 | 8/2011 | Mandryk et al. |
| 2011/0250950 A1 | 10/2011 | Nonaka |
| 2011/0282697 A1 | 11/2011 | Fitzgerald et al. |
| 2011/0307377 A1 | 12/2011 | Nelsen et al. |
| 2012/0036433 A1 | 2/2012 | Zimmer et al. |
| 2012/0078788 A1 | 3/2012 | Gandhi |
| 2012/0095918 A1 | 4/2012 | Jurss |
| 2012/0110456 A1 | 5/2012 | Larco et al. |
| 2012/0150750 A1 | 6/2012 | Law et al. |
| 2012/0197743 A1 | 8/2012 | Grigg et al. |
| 2012/0202187 A1 | 8/2012 | Brinkerhoff, III |
| 2012/0212495 A1 | 8/2012 | Butcher et al. |
| 2012/0245941 A1 | 9/2012 | Cheyer |
| 2012/0253986 A1 | 10/2012 | Chang |
| 2013/0024371 A1 | 1/2013 | Hariramani et al. |
| 2013/0091443 A1 | 4/2013 | Park et al. |
| 2013/0151636 A1 | 6/2013 | Majeti et al. |
| 2013/0185285 A1 | 7/2013 | Shuman et al. |
| 2013/0215226 A1 | 8/2013 | Chauvier et al. |
| 2013/0227705 A1 | 8/2013 | Yoon et al. |
| 2013/0246954 A1 | 9/2013 | Gray et al. |
| 2014/0020068 A1 | 1/2014 | Desai et al. |
| 2014/0043547 A1 | 2/2014 | Marhefka |
| 2014/0052794 A1 | 2/2014 | Tucker et al. |
| 2014/0063186 A2 | 3/2014 | Chauvier et al. |
| 2014/0074675 A1 | 3/2014 | Calman et al. |
| 2014/0173517 A1 | 6/2014 | Chaudhri et al. |
| 2014/0207679 A1 | 7/2014 | Cho |
| 2014/0215361 A1 | 7/2014 | Hwang et al. |
| 2014/0279454 A1 | 9/2014 | Raman et al. |
| 2014/0279474 A1 | 9/2014 | Evans et al. |
| 2014/0279530 A1 | 9/2014 | Douglas et al. |
| 2014/0279543 A1 | 9/2014 | Ruhrig |
| 2014/0359456 A1 | 12/2014 | Thiele et al. |
| 2014/0362093 A1 | 12/2014 | Lorach |
| 2014/0372920 A1 | 12/2014 | Choi et al. |
| 2014/0379341 A1 | 12/2014 | Seo et al. |
| 2014/0379557 A1 | 12/2014 | Brown |
| 2015/0003595 A1 | 1/2015 | Yaghi et al. |
| 2015/0005039 A1 | 1/2015 | Liu et al. |
| 2015/0044964 A1 | 2/2015 | Khan et al. |
| 2015/0073983 A1* | 3/2015 | Bartenstein .......... G06Q 20/325 705/41 |
| 2015/0091903 A1 | 4/2015 | Costello et al. |
| 2015/0193867 A1 | 7/2015 | Del Vecchio et al. |
| 2015/0264111 A1 | 9/2015 | Aleksandrov |
| 2015/0278814 A1 | 10/2015 | Jaffe |
| 2015/0339846 A1 | 11/2015 | Holzer et al. |
| 2015/0340025 A1 | 11/2015 | Shima |
| 2015/0341616 A1 | 11/2015 | Siegel et al. |
| 2015/0348001 A1 | 12/2015 | Van Os et al. |
| 2016/0004773 A1 | 1/2016 | Jannink et al. |
| 2016/0011768 A1 | 1/2016 | Yim et al. |
| 2016/0034152 A1 | 2/2016 | Wilson et al. |
| 2016/0048161 A1 | 2/2016 | Carceroni et al. |
| 2016/0086150 A1 | 3/2016 | Gomi et al. |
| 2016/0086166 A1 | 3/2016 | Pomeroy et al. |
| 2016/0098882 A1 | 4/2016 | Holdych et al. |
| 2016/0104159 A1 | 4/2016 | Butterfield et al. |
| 2016/0117670 A1 | 4/2016 | Davis |
| 2016/0156574 A1 | 6/2016 | Hum et al. |
| 2016/0171481 A1 | 6/2016 | McElmurry et al. |
| 2016/0180316 A1 | 6/2016 | Wang et al. |
| 2016/0180325 A1 | 6/2016 | Davis et al. |
| 2016/0180578 A1 | 6/2016 | Vegesna |
| 2016/0189717 A1 | 6/2016 | Kannan et al. |
| 2016/0225371 A1 | 8/2016 | Agrawal et al. |
| 2016/0259518 A1 | 9/2016 | King et al. |
| 2016/0260031 A1 | 9/2016 | Pace et al. |
| 2016/0260088 A1* | 9/2016 | Olson ................... G07F 7/0833 |
| 2016/0267447 A1 | 9/2016 | Davis et al. |
| 2016/0277342 A1 | 9/2016 | Shi |
| 2016/0292663 A1 | 10/2016 | Sagan et al. |
| 2016/0352667 A1 | 12/2016 | Pickett et al. |
| 2016/0358167 A1 | 12/2016 | Van Os et al. |
| 2016/0364715 A1 | 12/2016 | Cho et al. |
| 2016/0378186 A1 | 12/2016 | Kim |
| 2017/0004484 A1 | 1/2017 | Seol et al. |
| 2017/0046111 A1 | 2/2017 | Chu et al. |
| 2017/0046339 A1 | 2/2017 | Bhat et al. |
| 2017/0090589 A1 | 3/2017 | Sharma et al. |
| 2017/0123498 A1 | 5/2017 | Dillon et al. |
| 2017/0154328 A1 | 6/2017 | Zarakas et al. |
| 2017/0180813 A1 | 6/2017 | Kang et al. |
| 2017/0193501 A1 | 7/2017 | Cole et al. |
| 2017/0228704 A1 | 8/2017 | Zhou et al. |
| 2017/0237692 A1 | 8/2017 | Sheth et al. |
| 2017/0339347 A1 | 11/2017 | Cho et al. |
| 2017/0344526 A1 | 11/2017 | Smith et al. |
| 2017/0357426 A1 | 12/2017 | Wilson et al. |
| 2017/0357427 A1 | 12/2017 | Wilson et al. |
| 2017/0357443 A1 | 12/2017 | Paek et al. |
| 2018/0053169 A1 | 2/2018 | James |
| 2018/0081515 A1 | 3/2018 | Block et al. |
| 2018/0109482 A1 | 4/2018 | Deluca et al. |
| 2018/0113579 A1 | 4/2018 | Johnston et al. |
| 2018/0143748 A1 | 5/2018 | Ahmed et al. |
| 2018/0197170 A1 | 7/2018 | Zhang et al. |
| 2018/0218359 A1 | 8/2018 | Kim et al. |
| 2018/0240086 A1 | 8/2018 | Sobotka |
| 2018/0246635 A1 | 8/2018 | Baer et al. |
| 2018/0329587 A1 | 11/2018 | Ko et al. |
| 2018/0335928 A1* | 11/2018 | Van Os ............... G06Q 20/204 |
| 2018/0336543 A1 | 11/2018 | Van Os et al. |
| 2019/0146654 A1* | 5/2019 | Hu ...................... G06F 3/04817 715/835 |
| 2019/0339860 A1 | 11/2019 | Chen et al. |
| 2020/0143353 A1 | 5/2020 | Van Os et al. |
| 2020/0302518 A1 | 9/2020 | Van Os et al. |
| 2021/0027269 A1 | 1/2021 | Van Os et al. |
| 2021/0272092 A1 | 9/2021 | Van Os et al. |
| 2021/0311619 A1 | 10/2021 | Winnemoeller et al. |
| 2022/0172200 A1 | 6/2022 | Shen et al. |
| 2022/0245618 A1 | 8/2022 | King et al. |
| 2023/0035532 A1 | 2/2023 | Chen et al. |
| 2023/0325805 A1 | 10/2023 | Van Os et al. |

(56) References Cited

U.S. PATENT DOCUMENTS

| | | | |
|---|---|---|---|
| 2024/0045578 A1 | 2/2024 | Chen et al. | |
| 2024/0420109 A1 | 12/2024 | Van Os et al. | |
| 2025/0348194 A1 | 11/2025 | Chen et al. | |

FOREIGN PATENT DOCUMENTS

| | | |
|---|---|---|
| CN | 101059756 A | 10/2007 |
| CN | 101128794 A | 2/2008 |
| CN | 102214335 A | 10/2011 |
| CN | 102541438 A | 7/2012 |
| CN | 104885089 A | 9/2015 |
| CN | 105354034 A | 2/2016 |
| CN | 106470110 A | 3/2017 |
| CN | 106506322 A | 3/2017 |
| CN | 106814886 A | 6/2017 |
| CN | 109287116 A | 1/2019 |
| CN | 110460797 A | 11/2019 |
| EP | 2980741 A1 | 2/2016 |
| EP | 3062271 A1 | 8/2016 |
| EP | 3096275 A1 | 11/2016 |
| EP | 3047622 B1 | 8/2017 |
| EP | 3349400 A1 | 7/2018 |
| JP | 2000-270264 A | 9/2000 |
| JP | 2003-67210 A | 3/2003 |
| JP | 2003-125366 A | 4/2003 |
| JP | 2004-37998 A | 2/2004 |
| JP | 2004-334642 A | 11/2004 |
| JP | 2005-245619 A | 9/2005 |
| JP | 2005-284592 A | 10/2005 |
| JP | 2005-352679 A | 12/2005 |
| JP | 2006-222531 A | 8/2006 |
| JP | 2007-226794 A | 9/2007 |
| JP | 2009-9252 A | 1/2009 |
| JP | 2010-109552 A | 5/2010 |
| JP | 2011-503711 A | 1/2011 |
| JP | 2011-34574 A | 2/2011 |
| JP | 2012-113600 A | 6/2012 |
| JP | 2012-113644 A | 6/2012 |
| JP | 2013-157959 A | 8/2013 |
| JP | 2013-229656 A | 11/2013 |
| JP | 2014-517366 A | 7/2014 |
| JP | 2014-520296 A | 8/2014 |
| JP | 2014-174649 A | 9/2014 |
| JP | 5661835 B2 | 1/2015 |
| JP | 2015-219862 A | 7/2015 |
| JP | 2015-534664 A | 12/2015 |
| JP | 2016-62482 A | 4/2016 |
| JP | 2016-224225 A | 12/2016 |
| JP | 2017-41098 A | 2/2017 |
| JP | 2017-50003 A | 3/2017 |
| JP | 2017-534934 A | 11/2017 |
| JP | 2018-506103 A | 3/2018 |
| JP | 2018-72912 A | 5/2018 |
| JP | 2018-524679 A | 8/2018 |
| JP | 2018-152073 A | 9/2018 |
| JP | 2020-17285 A | 1/2020 |
| JP | 2020-194555 A | 12/2020 |
| JP | 2021-502640 A | 1/2021 |
| KR | 10-2004-0027236 A | 4/2004 |
| KR | 10-2013-0097551 A | 9/2013 |
| KR | 10-2014-0070218 A | 6/2014 |
| KR | 10-2014-0094801 A | 7/2014 |
| KR | 10-2014-0131093 A | 11/2014 |
| KR | 10-2014-0139982 A | 12/2014 |
| KR | 10-2016-0024266 A | 3/2016 |
| KR | 10-2016-0054573 A | 5/2016 |
| KR | 10-2016-0076201 A | 6/2016 |
| KR | 10-2016-0105279 A | 9/2016 |
| KR | 10-2016-0132457 A | 11/2016 |
| KR | 10-2017-0011784 A | 2/2017 |
| KR | 10-2018-0051556 A | 5/2018 |
| WO | 2011/037134 A1 | 3/2011 |
| WO | 2012/129231 A1 | 9/2012 |
| WO | 2014/105631 A2 | 7/2014 |
| WO | 2014/172757 A1 | 10/2014 |
| WO | 2015/057320 A1 | 4/2015 |
| WO | 2015/138865 A2 | 9/2015 |
| WO | 2016/022203 A1 | 2/2016 |
| WO | 2016/032062 A1 | 3/2016 |
| WO | 2016/032534 A1 | 3/2016 |
| WO | 2016/129863 A1 | 8/2016 |
| WO | 2016/144385 A1 | 9/2016 |
| WO | 2016/144975 A2 | 9/2016 |
| WO | 2016/204936 A1 | 12/2016 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |
| WO | 2017/124116 A1 | 7/2017 |
| WO | 2017/218298 A1 | 12/2017 |
| WO | 2019/217003 A1 | 11/2019 |

OTHER PUBLICATIONS

Applicant-Initiated Interview Summary received for U.S. Appl. No. 18/382,248, mailed on Apr. 1, 2025, 2 pages.

Corrected Notice of Allowance received for U.S. Appl. No. 18/382,248, mailed on May 16, 2025, 2 pages.

Decision to Grant received for European Patent Application No. 22729905.4, mailed on Mar. 27, 2025, 4 pages.

Decision to Grant received for Japanese Patent Application No. 2022-013919, mailed on Feb. 17, 2025, 4 pages (2 pages of English Translation and 2 pages of Official Copy).

Decision to Grant received for Japanese Patent Application No. 2023-134400, mailed on Mar. 3, 2025, 3 pages (1 page of English Translation and 2 pages of Official Copy).

Extended European Search Report received for European Patent Application No. 25164661.8, mailed on Jul. 28, 2025, 9 pages.

Final Office Action received for U.S. Appl. No. 18/382,248, mailed on Dec. 18, 2024, 52 pages.

Hao, Liu, "The Design and Implementation of Rural Commercial Bank Online Banking", University of Electronic Science and Technology of China Online available at: https://www.cnki.net, Mar. 25, 2015, 83 pages {See Communication Under Rule 37 CFR § 1.98(a) (3)}.

Intention to Grant received for European Patent Application No. 22729905.4, mailed on Nov. 14, 2024, 9 pages.

International Search Report and Written Opinion received for PCT Patent Application No. PCT/US2025/027087, mailed on Jun. 16, 2025, 15 pages.

Non-Final Office Action received for U.S. Appl. No. 18/382,248, mailed on Sep. 28, 2024, 43 pages.

Non-Final Office Action received for U.S. Appl. No. 18/821,090, mailed on Aug. 29, 2025, 28 pages.

Notice of Allowance received for Chinese Patent Application No. 201880048209.1, mailed on Jan. 23, 2025, 2 pages (1 page of English Translation and 1 page of Official Copy).

Notice of Allowance received for Chinese Patent Application No. 202210112700.4, mailed on Nov. 11, 2024, 2 pages (1 page of English Translation and 1 page of Official Copy).

Notice of Allowance received for Chinese Patent Application No. 202210639919.X, mailed on Apr. 28, 2025, 5 pages (1 page of English Translation and 4 pages of Official Copy).

Notice of Allowance received for Japanese Patent Application No. 2023-138172, mailed on Jan. 10, 2025, 5 pages (2 pages of English Translation and 3 pages of Official Copy).

Notice of Allowance received for Korean Patent Application No. 10-2024-7035938, mailed on Feb. 21, 2025, 8 pages (2 pages of English Translation and 6 pages of Official Copy).

Notice of Allowance received for U.S. Appl. No. 18/209,333, mailed on Sep. 19, 2024, 8 pages.

Notice of Allowance received for U.S. Appl. No. 18/382,248, mailed on Apr. 30, 2025, 9 pages.

Notice of Allowance received for U.S. Appl. No. 18/382,248, mailed on Sep. 10, 2025, 9 pages.

Office Action received for Australian Patent Application No. 2024203181, mailed on Feb. 21, 2025, 3 pages.

(56)  References Cited

OTHER PUBLICATIONS

Office Action received for Australian Patent Application No. 2024203181, mailed on Jan. 23, 2025, 3 pages.
Office Action received for Chinese Patent Application No. 201880048209.1, mailed on Aug. 30, 2024, 10 pages (5 pages of English Translation and 5 pages of Official Copy).
Office Action received for Chinese Patent Application No. 202210639919.X, mailed on Jan. 9, 2025, 15 pages (9 pages of English Translation and 6 pages of Official Copy).
Office Action received for Chinese Patent Application No. 202311634654.5, mailed on Sep. 18, 2024, 14 pages (8 pages of English Translation and 6 pages of Official Copy).
Office Action received for Japanese Patent Application No. 2022-013919, mailed on Dec. 2, 2024, 4 pages (2 pages of English Translation and 2 pages of Official Copy).
Office Action received for Japanese Patent Application No. 2024-156798, mailed on Aug. 15, 2025, 10 pages (5 pages of English Translation and 5 pages of Official Copy).
Office Action received for Korean Patent Application No. 10-2024-7035938, mailed on Nov. 21, 2024, 10 pages (4 pages of English Translation and 6 pages of Official Copy).
Applicant-Initiated Interview Summary received for U.S. Appl. No. 18/821,090, mailed on Oct. 2, 2025, 4 pages.
Applicant-Initiated Interview Summary received for U.S. Appl. No. 15/884,195, mailed on Apr. 28, 2020, 5 pages.
Applicant-Initiated Interview Summary received for U.S. Appl. No. 15/884,195, mailed on Aug. 17, 2021, 4 pages.
Applicant-Initiated Interview Summary received for U.S. Appl. No. 15/884,195, mailed on Dec. 17, 2020, 3 pages.
Applicant-Initiated Interview Summary received for U.S. Appl. No. 15/981,817, mailed on Apr. 22, 2020, 5 pages.
Interview Summary received for U.S. Appl. No. 16/736,704, mailed on Aug. 27, 2020, 5 pages.
Interview Summary received for U.S. Appl. No. 16/736,704, mailed on Dec. 11, 2020, 4 pages.
Applicant-Initiated Interview Summary received for U.S. Appl. No. 17/037,085, mailed on Sep. 27, 2021, 4 pages.
Applicant-Initiated Interview Summary received for U.S. Appl. No. 17/321,006, mailed on Aug. 25, 2023, 2 pages.
Applicant-Initiated Interview Summary received for U.S. Appl. No. 17/321,006, mailed on Jan. 3, 2023, 4 pages.
Applicant-Initiated Interview Summary received for U.S. Appl. No. 17/366,698, mailed on Aug. 25, 2023, 2 pages.
Applicant-Initiated Interview Summary received for U.S. Appl. No. 17/738,940, mailed on Mar. 7, 2023, 4 pages.
Applicant-Initiated Interview Summary received for U.S. Appl. No. 18/209,333, mailed on May 2, 2024, 4 pages.
Brief Communication Regarding Oral Proceedings received for European Patent Application No. 18730556.0, mailed on Aug. 23, 2023, 1 page.
Corrected Notice of Allowance received for U.S. Appl. No. 17/321,006, mailed on Aug. 31, 2023, 6 pages.
Corrected Notice of Allowance received for U.S. Appl. No. 17/366,698, mailed on Mar. 6, 2024, 3 pages.
Corrected Notice of Allowance received for U.S. Appl. No. 17/738,940, mailed on Jan. 24, 2024, 3 pages.
Decision of Refusal received for Japanese Patent Application No. 2021-157213, mailed on May 15, 2023, 4 pages (2 pages of English Translation and 2 pages of Official Copy).
Decision to Grant received for Danish Patent Application No. PA201770502, mailed on Feb. 25, 2021, 2 pages.
Decision to Grant received for Danish Patent Application No. PA201770503, mailed on Feb. 14, 2020, 2 pages.
Decision to Grant received for European Patent Application No. 18730556.0, mailed on Dec. 7, 2023, 4 pages.
Decision to Grant received for European Patent Application No. 20204436.8, mailed on Oct. 12, 2023, 4 pages.
European Search Report received for European Patent Application No. 20204436.8, mailed on Mar. 9, 2021, 5 pages.

Examiner's Pre-Review Report received for Japanese Patent Application No. 2021-157213, mailed on Oct. 25, 2023, 3 pages (2 pages of English Translation and 1 page of Official Copy).
Extended European Search Report received for European Patent Application No. 22153137.9, mailed on Jul. 15, 2022, 7 pages.
Extended European Search Report received for European Patent Application No. 23190272.7, mailed on Nov. 21, 2023, 11 pages.
Final Office Action received for U.S. Appl. No. 15/884,195, mailed on Feb. 22, 2021, 26 pages.
Final Office Action received for U.S. Appl. No. 15/884,195, mailed on Sep. 29, 2020, 20 pages.
Final Office Action received for U.S. Appl. No. 16/736,704, mailed on Oct. 13, 2020, 62 pages.
Final Office Action received for U.S. Appl. No. 17/366,698, mailed on Dec. 12, 2023, 17 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Intention to Grant received for Danish Patent Application No. PA201770502, mailed on Oct. 6, 2020, 2 pages.
Intention to Grant received for Danish Patent Application No. PA201770503, mailed on Nov. 11, 2019, 2 pages.
Intention to Grant received for European Patent Application No. 18730556.0, mailed on Sep. 20, 2023, 9 pages.
Intention to Grant received for European Patent Application No. 20204436.8, mailed on May 3, 2023, 10 pages.
Intention to Grant received for European Patent Application No. 20204436.8, mailed on Sep. 19, 2023, 9 pages.
International Preliminary Report on Patentability received for PCT Patent Application No. PCT/US2018/033054, mailed on Nov. 28, 2019, 21 pages.
International Preliminary Report on Patentability received for PCT Patent Application No. PCT/US2022/029279, mailed on Nov. 23, 2023, 11 pages.
International Search Report and Written Opinion received for PCT Patent Application No. PCT/US2018/033054, mailed on Oct. 30, 2018, 32 pages.
International Search Report and Written Opinion received for PCT Patent Application No. PCT/US2022/029279, mailed on Nov. 9, 2022, 16 pages.
Invitation to Pay Additional Fees and Partial International Search Report received for PCT Patent Application No. PCT/US2022/029279, mailed on Sep. 15, 2022, 9 pages.
Invitation to Pay Additional Fees received for PCT Patent Application No. PCT/US2018/033054, mailed on Sep. 4, 2018, 25 pages.
Invitation to Pay Search Fees received for European Patent Application No. 18730556.0, mailed on Mar. 2, 2020, 3 pages.
Non-Final Office Action received for U.S. Appl. No. 17/037,085, mailed on Jul. 8, 2021, 37 pages.
Non-Final Office Action received for U.S. Appl. No. 15/884,195, mailed on Feb. 27, 2020, 18 pages.
Non-Final Office Action received for U.S. Appl. No. 15/884,195, mailed on May 18, 2021, 26 pages.
Non-Final Office Action received for U.S. Appl. No. 15/981,817, mailed on Jan. 2, 2020, 31 pages.
Non-Final Office Action received for U.S. Appl. No. 16/736,704, mailed on May 1, 2020, 41 pages.
Non-Final Office Action received for U.S. Appl. No. 17/321,006, mailed on Nov. 1, 2022, 10 pages.
Non-Final Office Action received for U.S. Appl. No. 17/366,698, mailed on Jul. 31, 2023, 20 pages.
Non-Final Office Action received for U.S. Appl. No. 17/738,940, mailed on Dec. 22, 2022, 31 pages.
Non-Final Office Action received for U.S. Appl. No. 18/209,333, mailed on Mar. 27, 2024, 19 pages.
Notice of Acceptance received for Australian Patent Application No. 2018269512, mailed on Jan. 28, 2020, 3 pages.
Notice of Acceptance received for Australian Patent Application No. 2020202953, mailed on Oct. 1, 2021, 3 pages.
Notice of Acceptance received for Australian Patent Application No. 2021290334, mailed on Feb. 8, 2023, 3 pages.

(56) References Cited

OTHER PUBLICATIONS

Notice of Acceptance received for Australian Patent Application No. 2022200367, mailed on Mar. 23, 2023, 3 pages.
Notice of Acceptance received for Australian Patent Application No. 2023203197, mailed on Feb. 5, 2024, 3 pages.
Notice of Allowance received for Chinese Patent Application No. 202010174749.3, mailed on Oct. 28, 2021, 4 pages (3 pages of English Translation and 1 page of Official Copy).
Notice of Allowance received for Chinese Patent Application No. 202011206499.3, mailed on Feb. 14, 2022, 6 pages (3 pages of English Translation and 3 pages of Official Copy).
Notice of Allowance received for Chinese Patent Application No. 202210023470.4, mailed on Mar. 22, 2023, 3 pages (2 pages of English Translation and 1 page of Official Copy).
Notice of Allowance received for Japanese Patent Application No. 2019-572834, mailed on Nov. 1, 2021, 5 pages (1 page of English Translation and 4 pages of Official Copy).
Notice of Allowance received for Japanese Patent Application No. 2021-157213, mailed on Jun. 17, 2024, 19 pages (1 page of English Translation and 18 pages of Official Copy).
Notice of Allowance received for Japanese Patent Application No. 2023-559823, mailed on Aug. 19, 2024, 5 pages (1 page of English Translation and 4 pages of Official Copy).
Notice of Allowance received for Korean Patent Application No. 10-2019-7033768, mailed on Jun. 3, 2020, 6 pages (2 pages of English Translation and 4 pages of Official Copy).
Notice of Allowance received for Korean Patent Application No. 10-2020-7025711, mailed on Jan. 19, 2021, 6 pages (2 pages of English Translation and 4 pages of Official Copy).
Notice of Allowance received for Korean Patent Application No. 10-2021-7011434, mailed on Jul. 29, 2021, 5 pages (2 pages of English Translation and 3 pages of Official Copy).
Notice of Allowance received for Korean Patent Application No. 10-2021-7035417, mailed on Jan. 3, 2022, 5 pages (1 page of English Translation and 4 pages of Official Copy).
Notice of Allowance received for Korean Patent Application No. 10-2022-0006401, mailed on Apr. 5, 2024, 7 pages (2 pages of English Translation and 5 pages of Official Copy).
Notice of Allowance received for Korean Patent Application No. 10-2022-7007288, mailed on Mar. 17, 2022, 5 pages (1 page of English Translation and 4 pages of Official Copy).
Notice of Allowance received for Korean Patent Application No. 10-2022-7019902, mailed on Oct. 28, 2022, 8 pages (2 pages of English Translation and 6 pages of Official Copy).
Notice of Allowance received for Korean Patent Application No. 10-2023-7003678, mailed on Jul. 21, 2023, 8 pages (2 pages of English Translation and 6 pages of Official Copy).
Notice of Allowance received for Korean Patent Application No. 10-2023-7033642, mailed on Apr. 18, 2024, 7 pages (2 pages of English Translation and 5 pages of Official Copy).
Notice of Allowance received for Korean Patent Application No. 10-2023-7036172, mailed on Nov. 8, 2023, 8 pages (2 pages of English Translation and 6 pages of Official Copy).
Notice of Allowance received for Korean Patent Application No. 10-2024-7004706, mailed on Feb. 22, 2024, 8 pages (2 pages of English Translation and 6 pages of Official Copy).
Notice of Allowance received for Korean Patent Application No. 10-2024-7017078, mailed on Aug. 1, 2024, 8 pages (2 pages of English Translation and 6 pages of Official Copy).
Notice of Allowance received for U.S. Appl. No. 15/884,195, mailed on Nov. 17, 2021, 19 pages.
Notice of Allowance received for U.S. Appl. No. 15/981,817, mailed on May 28, 2020, 16 pages.
Notice of Allowance received for U.S. Appl. No. 16/736,704, mailed on Feb. 23, 2021, 11 pages.
Notice of Allowance received for U.S. Appl. No. 17/037,085, mailed on Nov. 10, 2021, 10 pages.
Notice of Allowance received for U.S. Appl. No. 17/321,006, mailed on Aug. 16, 2023, 9 pages.
Notice of Allowance received for U.S. Appl. No. 17/321,006, mailed on Mar. 9, 2023, 8 pages.
Notice of Allowance received for U.S. Appl. No. 17/366,698, mailed on Jan. 31, 2024, 9 pages.
Notice of Allowance received for U.S. Appl. No. 17/738,940, mailed on Jun. 22, 2023, 9 pages.
Notice of Allowance received for U.S. Appl. No. 17/738,940, mailed on Oct. 2, 2023, 9 pages.
Notice of Allowance received for U.S. Appl. No. 18/209,333, mailed on Jul. 5, 2024, 10 pages.
Office Action received for Australian Patent Application No. 2020202953, mailed on Mar. 29, 2021, 4 pages.
Office Action received for Australian Patent Application No. 2021290334, mailed on Oct. 26, 2022, 3 pages.
Office Action received for Australian Patent Application No. 2022200367, mailed on Jan. 17, 2023, 4 pages.
Office Action received for Australian Patent Application No. 2023203197, mailed on Jan. 10, 2024, 3 pages.
Office Action received for Chinese Patent Application No. 201880048209.1, mailed on Jan. 31, 2024, 2 pages (1 page of English Translation and 1 page of Official Copy).
Office Action received for Chinese Patent Application No. 202010174749.3, mailed on Jun. 2, 2021, 19 pages (10 pages of English Translation and 9 pages of Official Copy).
Office Action received for Chinese Patent Application No. 202010174749.3, mailed on Nov. 6, 2020, 9 pages (3 pages of English Translation and 6 pages of Official Copy).
Office Action received for Chinese Patent Application No. 202011206499.3, mailed on May 21, 2021, 20 pages (10 pages of English Translation and 10 pages of Official Copy).
Office Action received for Chinese Patent Application No. 202011206499.3, mailed on Sep. 28, 2021, 7 pages (4 pages of English Translation and 3 pages of Official Copy).
Office Action received for Chinese Patent Application No. 202210023470.4, mailed on Sep. 5, 2022, 12 pages (6 pages of English Translation and 6 pages of Official Copy).
Office Action received for Chinese Patent Application No. 202210112700.4, mailed on Apr. 8, 2024, 19 pages (9 pages of English Translation and 10 pages of Official Copy).
Office Action received for Chinese Patent Application No. 202210639919.X, mailed on Jun. 15, 2024, 18 pages (10 pages of English Translation and 8 pages of Official Copy).
Office Action received for Chinese Patent Application No. 202311634654.5, mailed on Apr. 28, 2024, 19 pages (9 pages of English Translation and 10 pages of Official Copy).
Office Action received for Danish Patent Application No. PA201770502, mailed on Dec. 14, 2018, 7 pages.
Office Action received for Danish Patent Application No. PA201770502, mailed on Jan. 20, 2020, 2 pages.
Office Action received for Danish Patent Application No. PA201770502, mailed on May 7, 2020, 5 pages.
Office Action received for Danish Patent Application No. PA201770502, mailed on Sep. 9, 2019, 2 pages.
Office Action received for Danish Patent Application No. PA201770503, mailed on Dec. 19, 2018, 6 pages.
Office Action received for Danish Patent Application No. PA201770503, mailed on Nov. 24, 2017, 10 pages.
Office Action received for Danish Patent Application No. PA201770503, mailed on Sep. 20, 2019, 5 pages.
Office Action received for Danish Patent Application No. PA201770505, mailed on Aug. 18, 2021, 2 pages.
Office Action received for Danish Patent Application No. PA201770505, mailed on Jan. 17, 2020, 7 pages.
Office Action received for Danish Patent Application No. PA201770505, mailed on Jul. 27, 2018, 4 pages.
Office Action received for Danish Patent Application No. PA201770505, mailed on May 20, 2019, 7 pages.
Office Action received for Danish Patent Application No. PA201770505, mailed on Sep. 19, 2017, 10 pages.
Office Action received for European Patent Application No. 18730556.0, mailed on Dec. 16, 2020, 7 pages.
Office Action received for European Patent Application No. 18730556.0, mailed on Jun. 23, 2020, 11 pages.

(56)         References Cited

OTHER PUBLICATIONS

Office Action received for European Patent Application No. 20204436.8, mailed on Mar. 22, 2021, 10 pages.

Office Action received for European Patent Application No. 20204436.8, mailed on Sep. 21, 2022, 4 pages.

Office Action received for European Patent Application No. 22153137.9, mailed on Jul. 10, 2024, 6 pages.

Office Action received for European Patent Application No. 22729905.4, mailed on Mar. 22, 2024, 8 pages.

Office Action received for Japanese Patent Application No. 2019-572834, mailed on Dec. 4, 2020, 7 pages (3 pages of English Translation and 4 pages of Official Copy).

Office Action received for Japanese Patent Application No. 2019-572834, mailed on Jul. 17, 2020, 13 pages (7 pages of English Translation and 6 pages of Official Copy).

Office Action received for Japanese Patent Application No. 2019-572834, mailed on Jun. 7, 2021, 5 pages (2 pages of English Translation and 3 pages of Official Copy).

Office Action received for Japanese Patent Application No. 2021-157213, mailed on Oct. 28, 2022, 10 pages (5 pages of English Translation and 5 pages of Official Copy).

Office Action received for Japanese Patent Application No. 2022-013919, mailed on Jan. 30, 2023, 7 pages (4 pages of English Translation and 3 pages of Official Copy).

Office Action received for Japanese Patent Application No. 2022-013919, mailed on Jul. 3, 2023, 6 pages (3 pages of English Translation and 3 pages of Official Copy).

Office Action received for Japanese Patent Application No. 2023-138172, mailed on Jul. 12, 2024, 6 pages (3 pages of English Translation and 3 pages of Official Copy).

Office Action received for Japanese Patent Application No. 2023-559823, mailed on Jun. 10, 2024, 6 pages (3 pages of English Translation and 3 pages of Official Copy).

Office Action received for Japanese Patent Application No. 2023-559823, mailed on Mar. 4, 2024, 6 pages (3 pages of English Translation and 3 pages of Official Copy).

Office Action received for Korean Patent Application No. 10-2019-7033768, mailed on Mar. 13, 2020, 6 pages (2 pages of English Translation and 4 pages of Official Copy).

Office Action received for Korean Patent Application No. 10-2020-7025711, mailed on Sep. 11, 2020, 12 pages (5 pages of English Translation and 7 pages of Official Copy).

Office Action received for Korean Patent Application No. 10-2021-7011434, mailed on Apr. 28, 2021, 6 pages (2 pages of English Translation and 4 pages of Official Copy).

Office Action received for Korean Patent Application No. 10-2022-0006401, mailed on Jan. 25, 2024, 11 pages (5 pages of English Translation and 6 pages of Official Copy).

Office Action received for Korean Patent Application No. 10-2022-7019902, mailed on Jul. 1, 2022, 10 pages (4 pages of English Translation and 6 pages of Official Copy).

Office Action received for Korean Patent Application No. 10-2023-7003678, mailed on Feb. 15, 2023, 6 pages (2 pages of English Translation and 4 pages of Official Copy).

Office Action received for Korean Patent Application No. 10-2023-7033642, mailed on Dec. 4, 2023, 5 pages (2 pages of English Translation and 3 pages of Official Copy).

Pre-Appeal Review Report received for Japanese Patent Application No. 2022-013919, mailed on Oct. 27, 2023, 5 pages (2 pages of English Translation and 3 pages of Official Copy).

Search Report and Opinion received for Danish Patent Application No. PA201770502, mailed on Nov. 10, 2017, 10 pages.

Summons to Attend Oral Proceedings received for European Patent Application No. 18730556.0, mailed on Oct. 13, 2022, 6 pages.

Supplemental Notice of Allowance received for U.S. Appl. No. 15/884,195, mailed on Dec. 16, 2021, 3 pages.

* cited by examiner

700 ⟍

702
After receiving first data corresponding to a digital card that is stored in an electronic wallet of the computer system, wherein the first data includes a set of visual assets defined by an entity associated with an external computer system:

704
Receive a request to display a representation of the digital card.

706
In response to receiving the request to display the representation of the digital card, display the representation of the digital card having a respective appearance that is based on the first data and includes a visual effect that changes based on movement of the computer system, including:

708
In accordance with a determination that the first data includes a first set of visual assets defined by the entity associated with the external computer system, display the representation of the digital card having a first appearance that includes a representation of the first set of visual assets having the visual effect applied to the first set of visual assets.

710
In accordance with a determination that the first data includes a second set of visual assets that is different from the first set of visual assets and defined by the entity associated with the external computer system, display the representation of the digital card having a second appearance that is different from the first appearance and includes a representation of the second set of visual assets having the visual effect applied to the second set of visual assets.

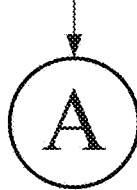

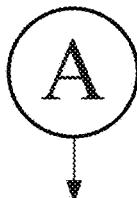

712
While displaying the representation of the digital card having the respective appearance that is based on the first data and includes the visual effect that changes based on movement of the computer system, detect movement of the computer system.

714
In response to detecting the movement of the computer system, update the respective appearance of the digital card to include a modification of the visual effect based on the detected movement of the computer system, including:

716
In accordance with a determination that the first data includes the first set of visual assets defined by the entity associated with the external computer system, display the representation of the digital card having a third appearance that is different from the first appearance and includes the representation of the first set of visual assets having the modified visual effect applied to the first set of visual assets.

718
In accordance with a determination that the first data includes the second set of visual assets defined by the entity associated with the external computer system, display the representation of the digital card having a fourth appearance that is different from the second appearance and includes the representation of the second set of visual assets having the modified visual effect applied to the second set of visual assets.

*FIG. 7B*

DISPLAYING A REPRESENTATION OF A DIGITAL CARD WITH A VISUAL EFFECT

CROSS REFERENCE TO RELATED APPLICATIONS

This application claims priority to U.S. Provisional Application No. 63/657,915, filed Jun. 9, 2024, entitled "DISPLAYING A REPRESENTATION OF A DIGITAL CARD WITH A VISUAL EFFECT," the entire disclosure of which is hereby incorporated by reference for all purposes.

FIELD

The present disclosure relates generally to computer user interfaces, and more specifically to techniques for displaying a representation of a digital card with a visual effect in a computer system user interface.

BACKGROUND

A computer system can be used to access information related to a card, identification document, pass, or account. The information can then be used to provide information, goods, or services to a user, such as providing identifying information, gaining entry to a location or venue, or completing a transaction. Typically, the information related to the card, pass, or account is associated with a user of the computer system.

BRIEF SUMMARY

Some techniques for using cards, identification documents, passes, or accounts using computer systems, however, are generally cumbersome and inefficient. For example, some existing techniques provide limited options for customizing the appearance of a representation of the card, identification document, pass, or account. In addition, some existing techniques do not provide adequate techniques for ensuring a displayed representation of a digital card is authentic, which can create a security risk and lead to an increased risk of experiencing counterfeit digital cards. Furthermore, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying a representation of a digital card with a visual effect. Such methods and interfaces optionally complement or replace other methods for using cards, identification documents, passes, or accounts. Such methods and interfaces reduce the cognitive burden on a user and produce a more efficient human-machine interface. For battery-operated computing devices, such methods and interfaces conserve power and increase the time between battery charges. Furthermore, such methods and interfaces provide enhanced security by making a representation of the digital card difficult to copy or counterfeit.

Example methods are described herein. An example method includes, at a computer system that is in communication with one or more display generation components and one or more input devices: after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

Example non-transitory computer-readable storage media are described herein. An example non-transitory computer-readable storage medium stores one or more programs configured to be executed by one or more processors of a computer system that is in communication with one or more display generation components and one or more input devices, the one or more programs including instructions for: after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

Example transitory computer-readable storage media are described herein. An example transitory computer-readable storage medium stores one or more programs configured to be executed by one or more processors of a computer system that is in communication with one or more display generation components and one or more input devices, the one or more programs including instructions for: after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

Example computer systems are described herein. An example computer system is configured to communicate with one or more display generation components and one or more input devices and includes: one or more processors; and memory storing one or more programs configured to be executed by the one or more processors, the one or more programs including instructions for: after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

An example computer system is configured to communicate with one or more display generation components and one or more input devices and includes: means for after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

Example computer program products are described herein. An example computer program product includes one or more programs configured to be executed by one or more processors of a computer system that is in communication with one or more display generation components and one or more input devices, the one or more programs including instructions for: after receiving first data corresponding to a digital card that is stored in an electronic wallet of the computer system, wherein the first data includes a set of visual assets defined by an entity associated with an external computer system: receiving, via the one or more input devices, a request to display a representation of the digital card; in response to receiving the request to display the representation of the digital card, displaying, via the one or more display generation components, the representation of the digital card having a respective appearance that is based on the first data and includes a visual effect that changes based on movement of the computer system, including: in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets; while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including: in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying a representation of a digital card with a visual effect, thereby increasing the effectiveness, efficiency, and user satisfaction with such devices. Such methods and interfaces may complement or replace other methods for displaying a representation of a digital card.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7B are a flow diagram illustrating a method for displaying a representation of a digital card with a visual effect, in accordance with some embodiments.

DESCRIPTION OF EMBODIMENTS

Figure 1A:
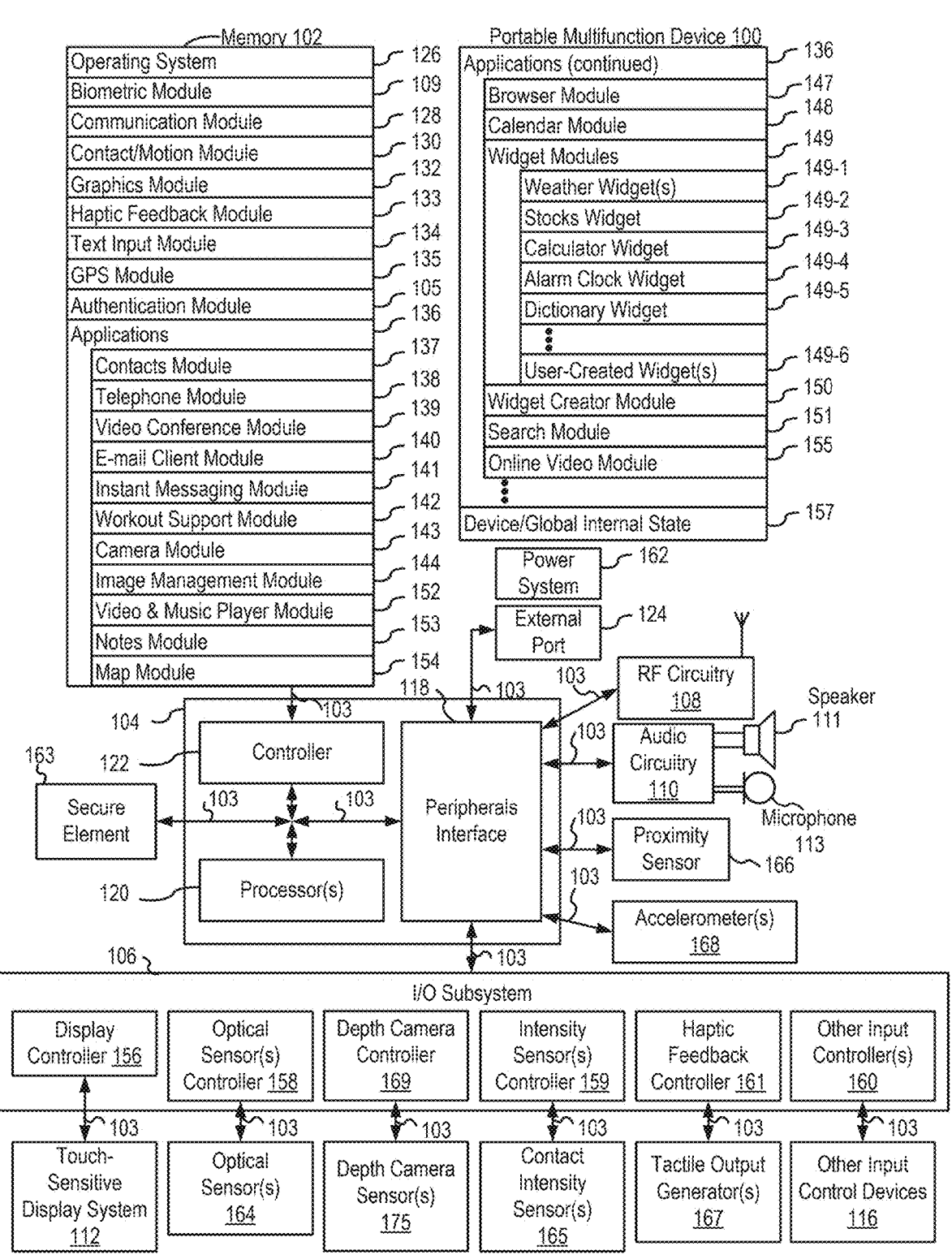
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying a representation of a digital card with a visual effect. For example, when card information associated with the electronic device is to be used to complete a transaction and/or to provide identifying information, a representation of the digital card is displayed by the electronic device. There is a need for a user to easily and efficiently recognize that the representation of the digital card corresponds to the card selected for use in the transaction and to verify that the representation of the card is authentic. Such techniques can reduce the cognitive burden on a user who uses a card, identification document, pass, or account for a transaction and/or to provide identifying information, thereby enhancing productivity. Further, such techniques can reduce processor and battery power otherwise wasted on redundant user inputs.

Below, FIGS. 1A-1B, 2, 3A-3G, 4A-4B, and 5A-5B provide a description of exemplary devices for performing the techniques for managing event notifications. FIGS. 6A-6J illustrate examples of a representation of a digital card having a visual effect, in accordance with some embodiments. FIGS. 7A-7B are a flow diagram illustrating a method for displaying a representation of a digital card with a visual effect, in accordance with some embodiments. The user interfaces in FIGS. 6A-6J are used to illustrate the processes described below, including the processes in FIGS. 7A-7B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, providing enhanced security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
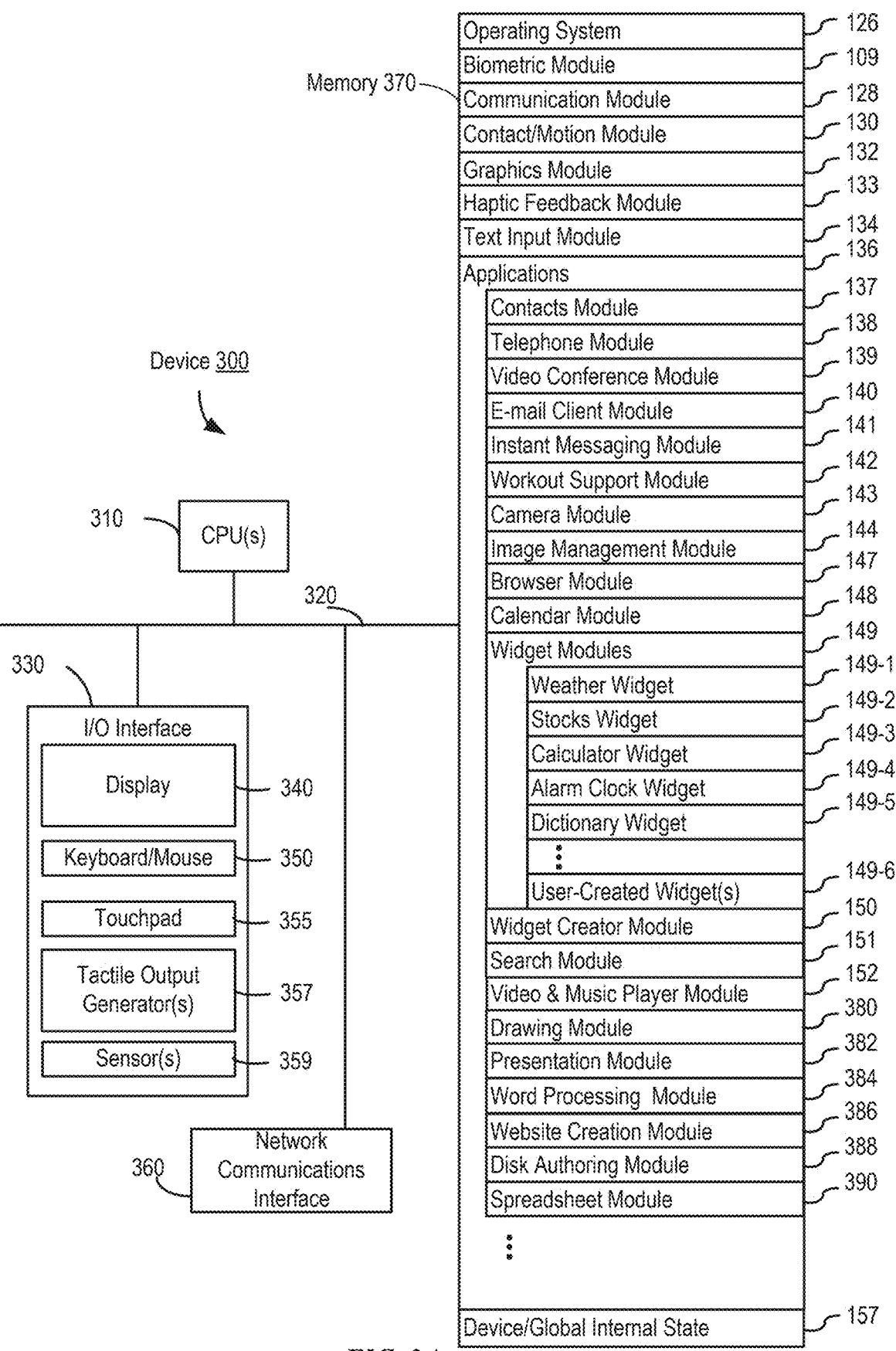
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-drag-ging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display con-troller 156 detect contact on a touchpad.

In some embodiments, contact/motion module 130 uses a set of one or more intensity thresholds to determine whether an operation has been performed by a user (e.g., to deter-mine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresh-olds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a par-ticular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subse-quently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, anima-tions, and the like.

In some embodiments, graphics module 132 stores data representing graphics to be used. Each graphic is, optionally, assigned a corresponding code. Graphics module 132 receives, from applications etc., one or more codes speci-fying graphics to be displayed along with, if necessary, coordinate data and other graphic property data, and then generates screen image data to output to display controller 156.

Haptic feedback module 133 includes various software components for generating instructions used by tactile out-put generator(s) 167 to produce tactile outputs at one or more locations on device 100 in response to user interactions with device 100.

Text input module 134, which is, optionally, a component of graphics module 132, provides soft keyboards for enter-ing text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentica-tion. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following mod-ules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created wid-gets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing appli-cations, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
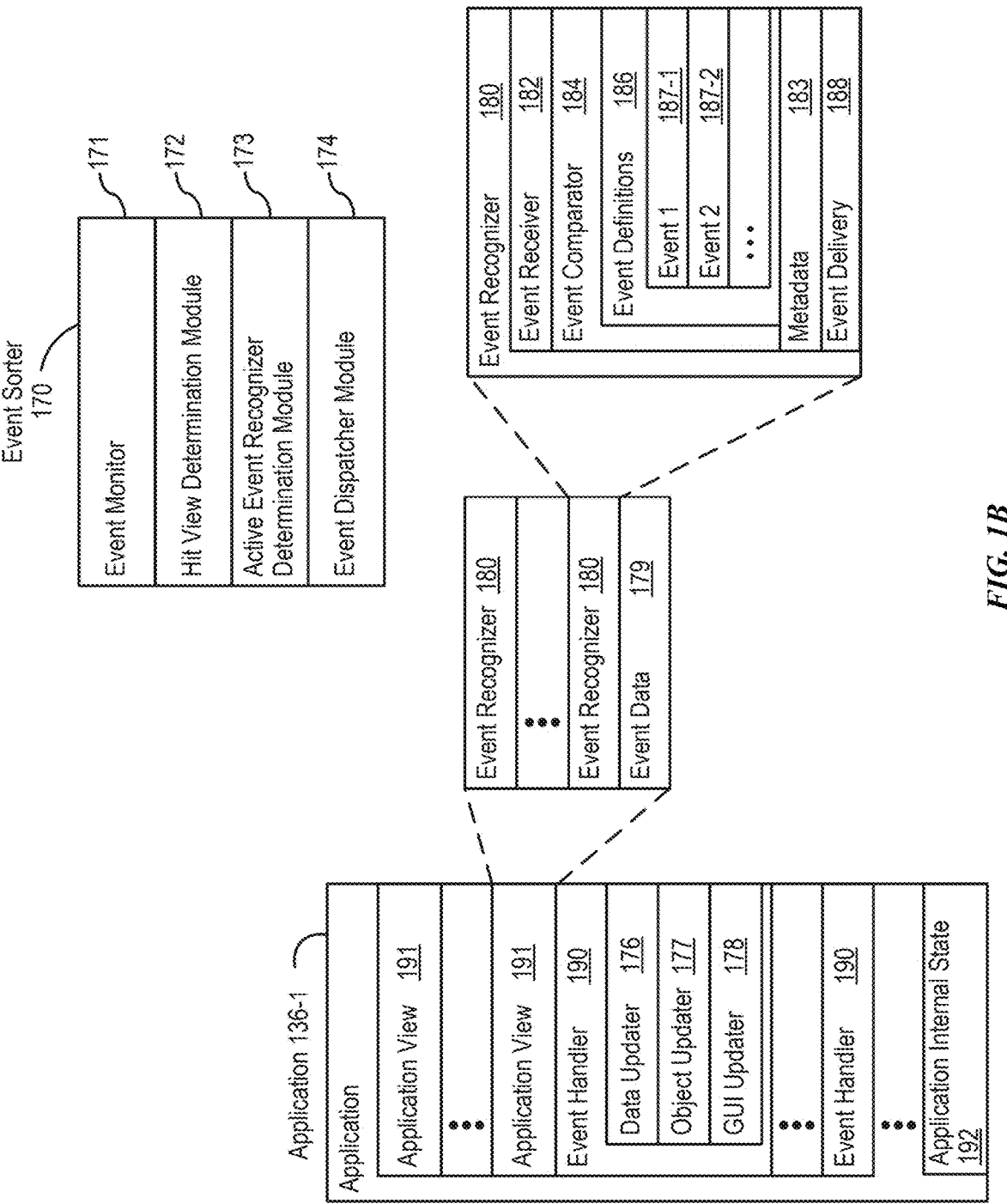
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
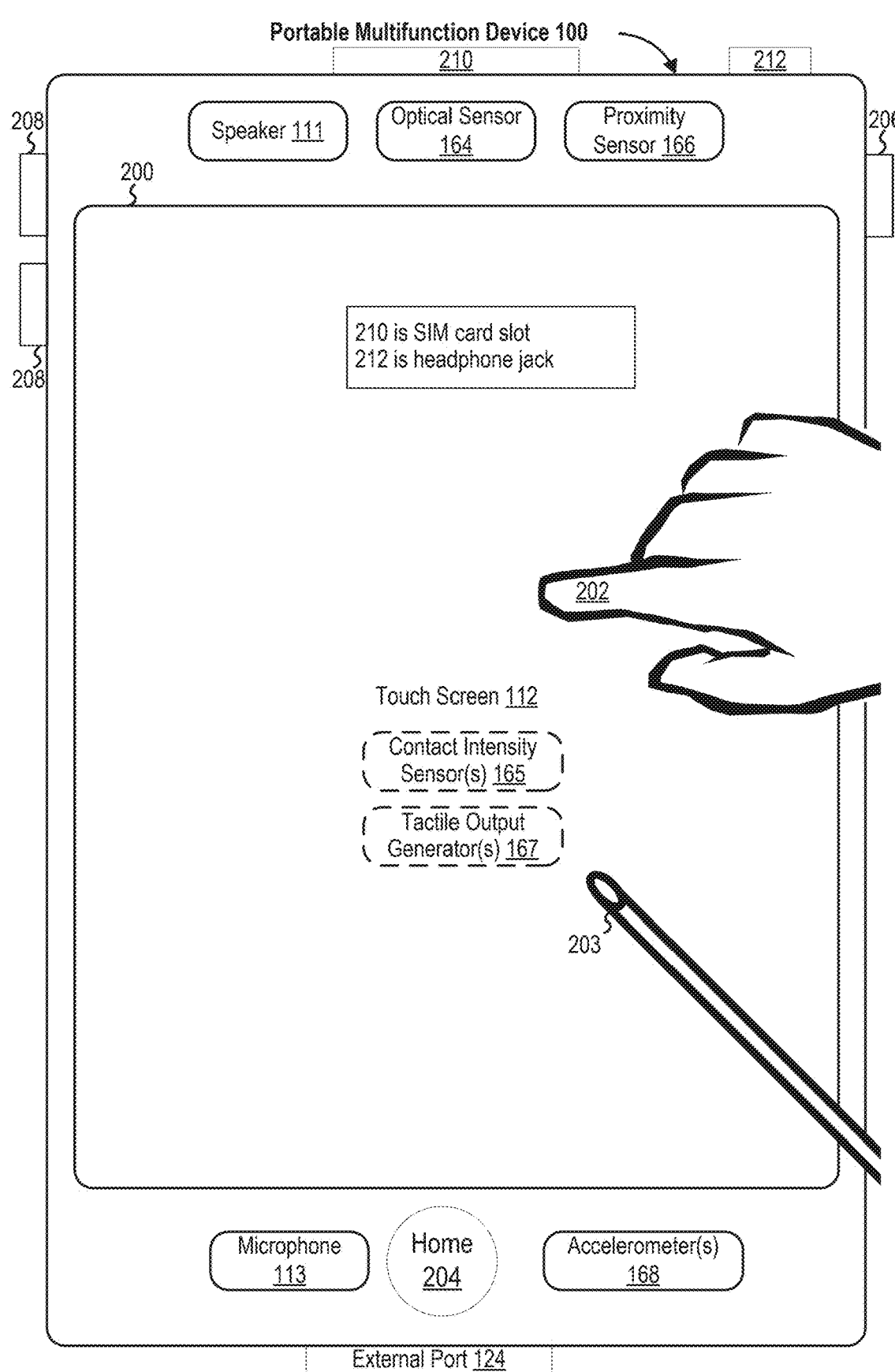
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
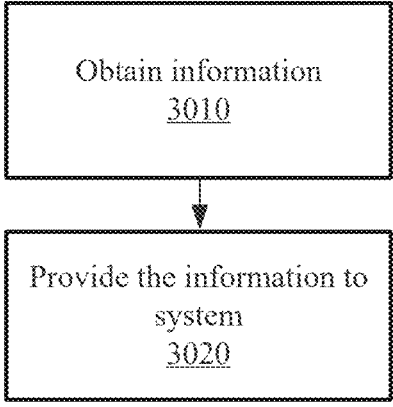
FIGS. 3B-3G illustrate the use of Application Programming Interfaces (APIs) to perform operations.
Figure 3C:
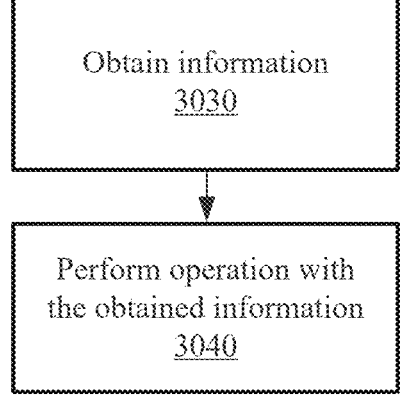

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
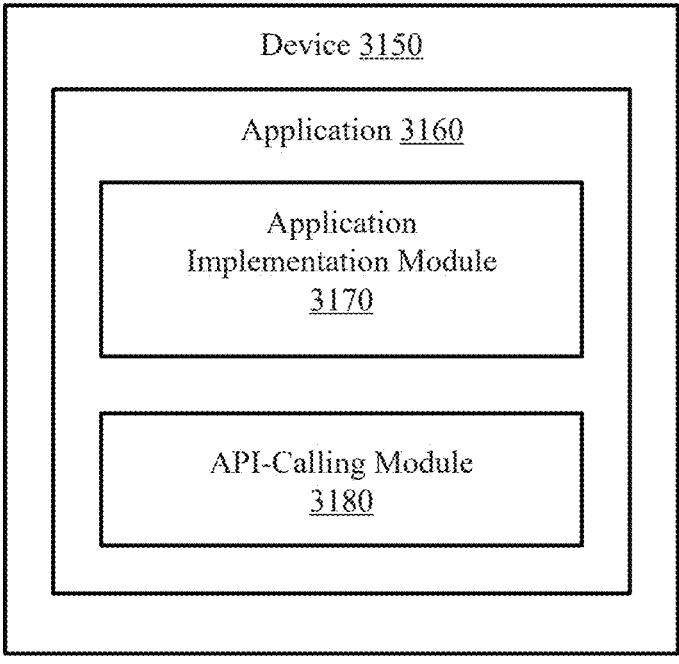
Figure 3E:
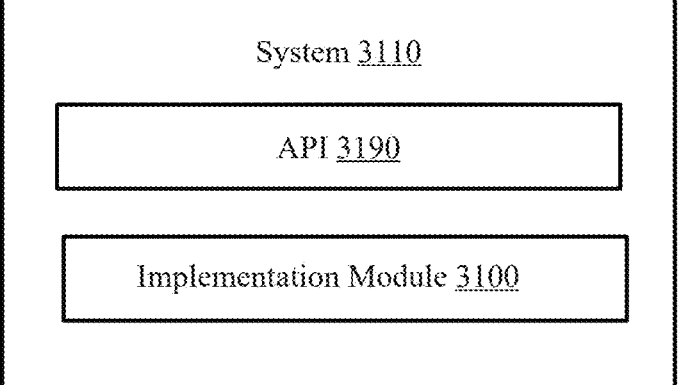
Figure 3F:
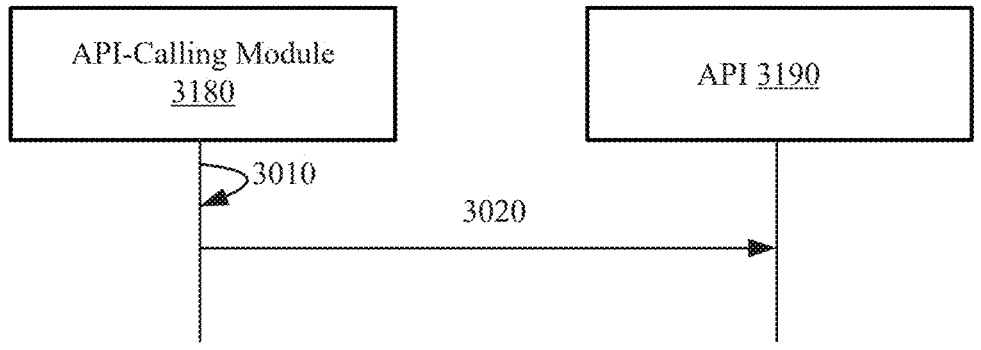

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
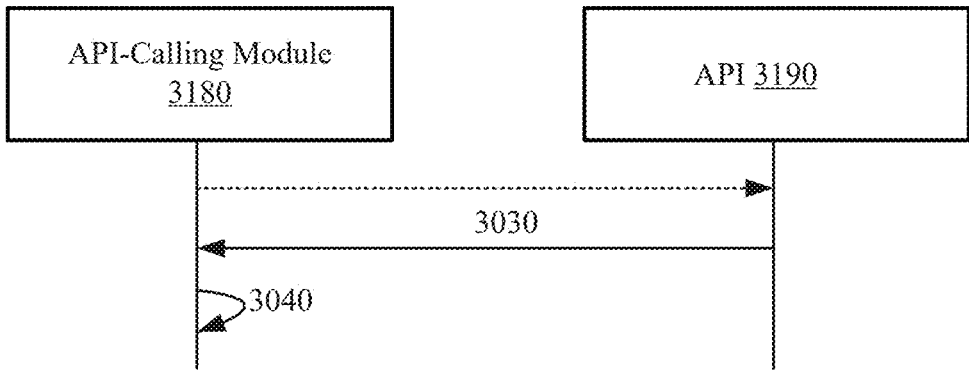

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform method 700 (FIGS. 7A-7B) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
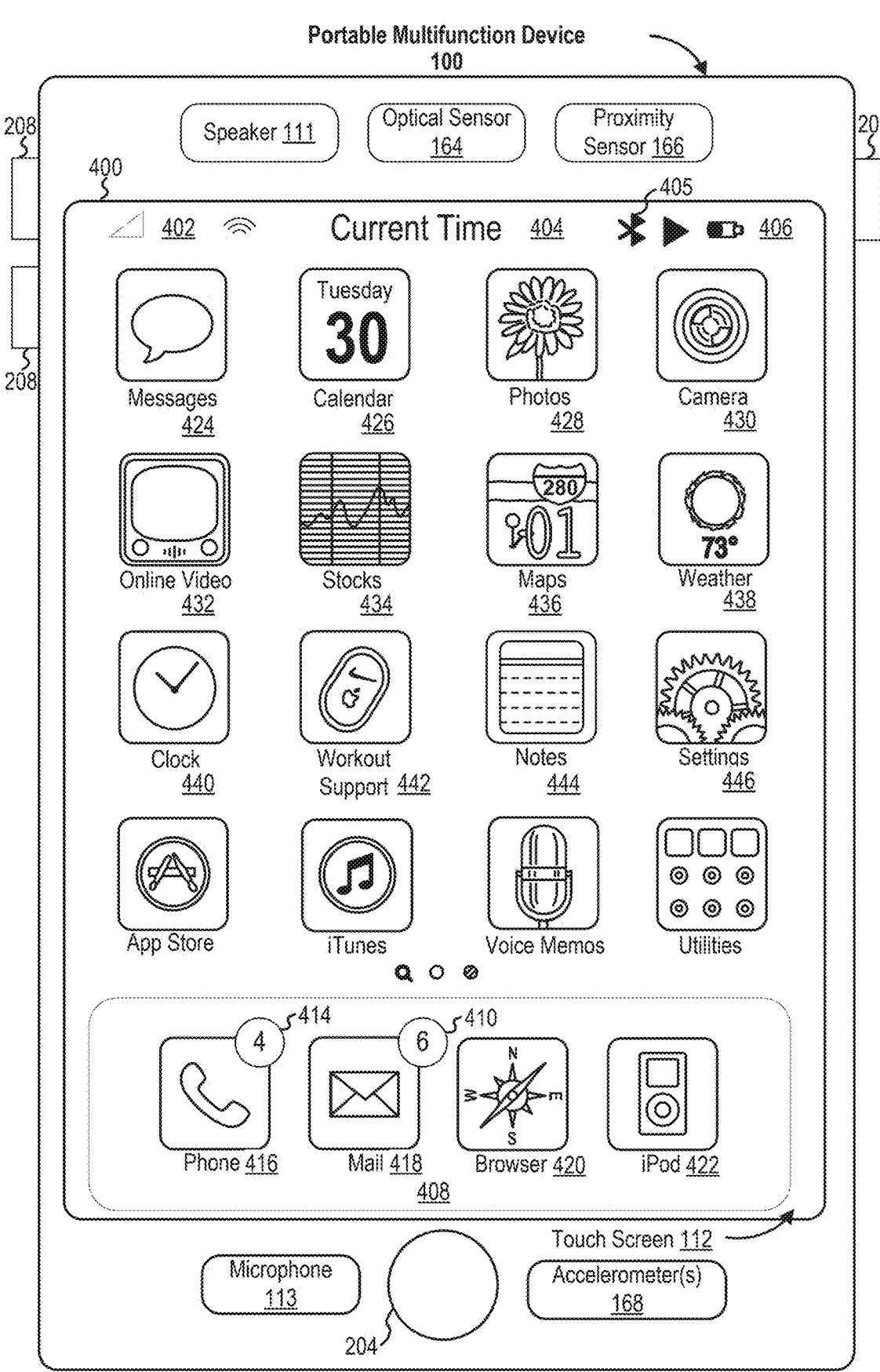
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
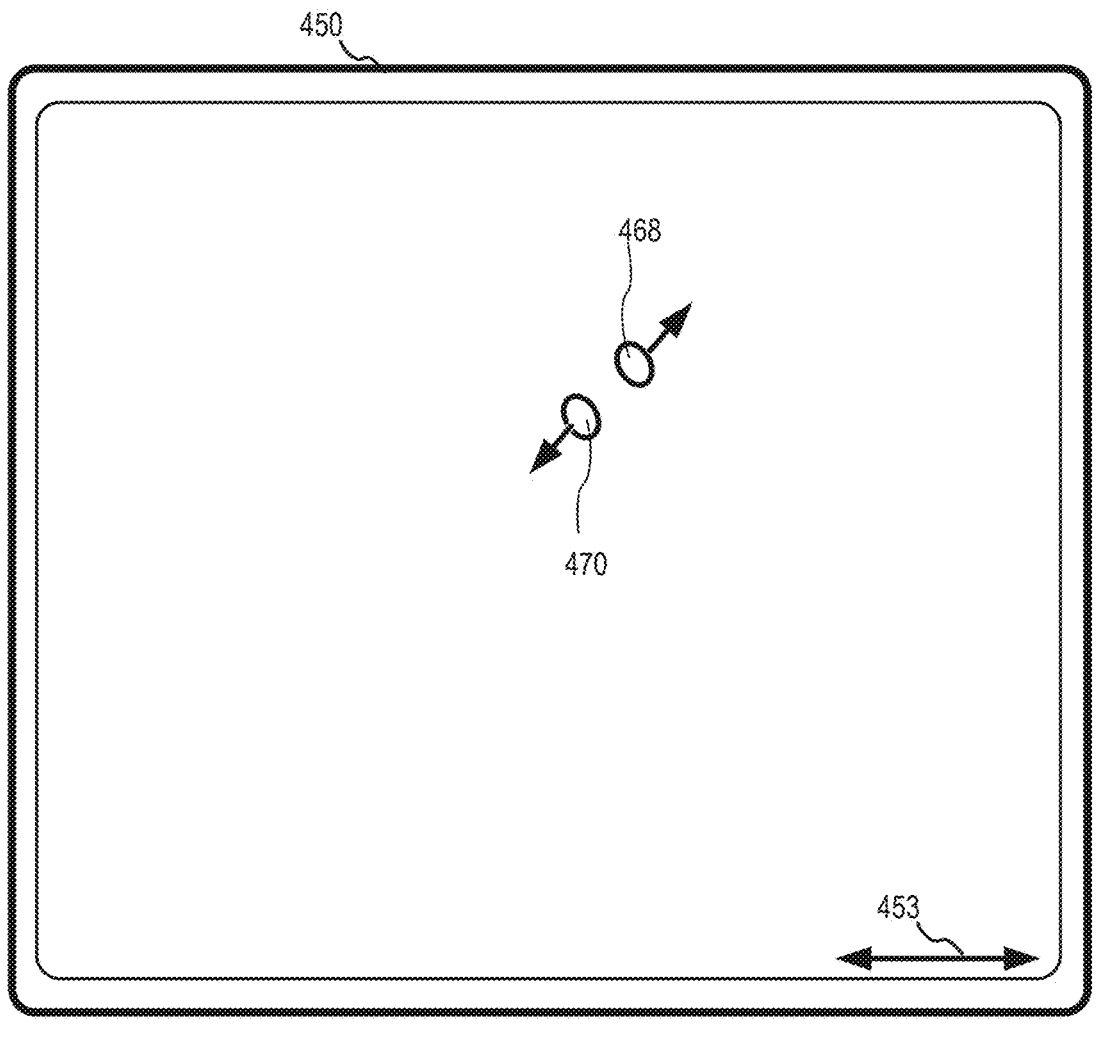
FIG. 4B illustrates an exemplary user interface for a multifunction device with a touch-sensitive surface that is separate from the display in accordance with some embodiments.
Figure 4B:
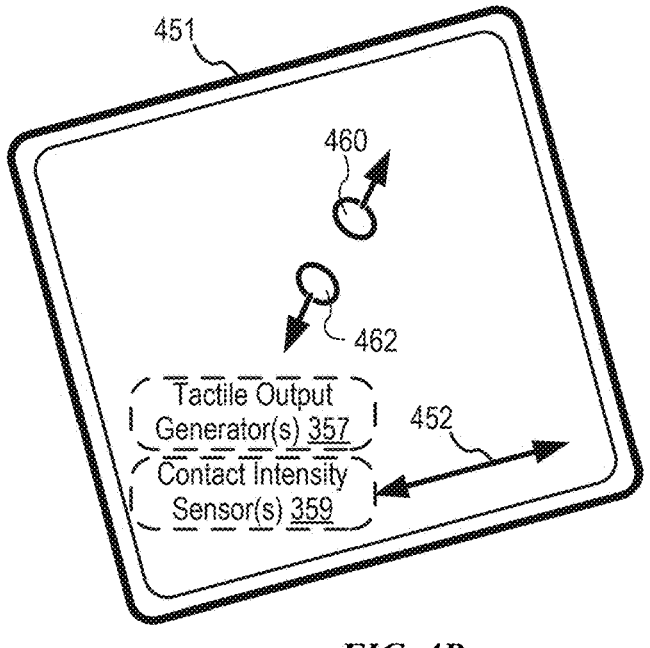

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
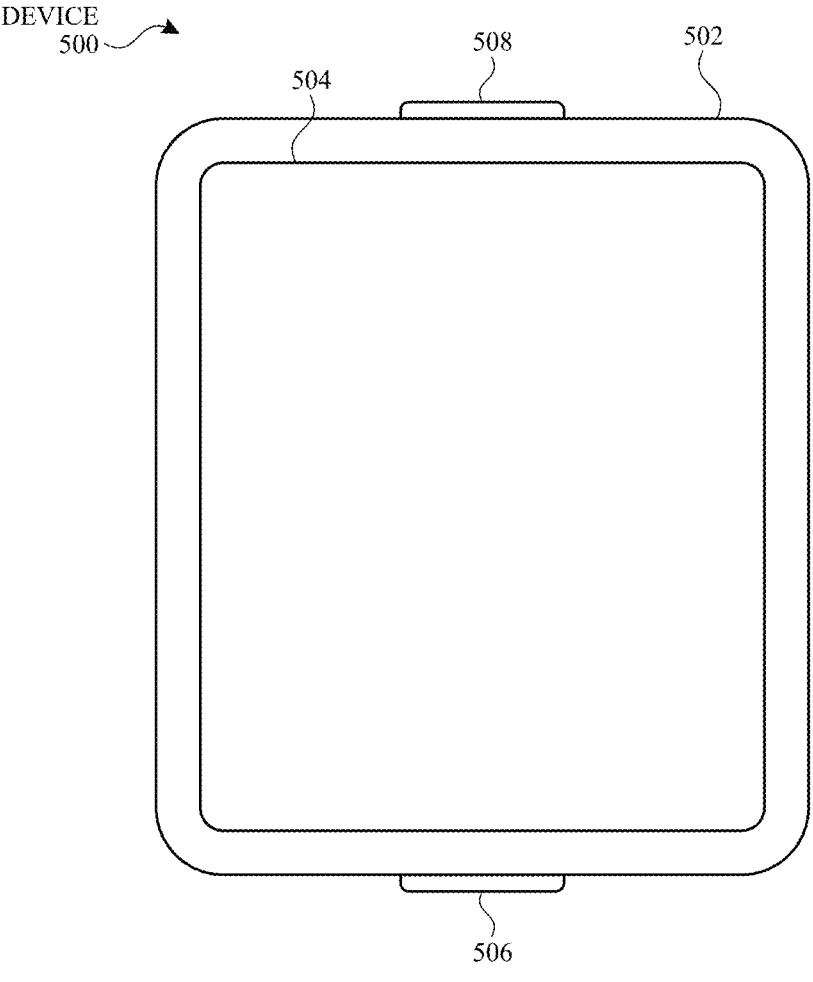
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
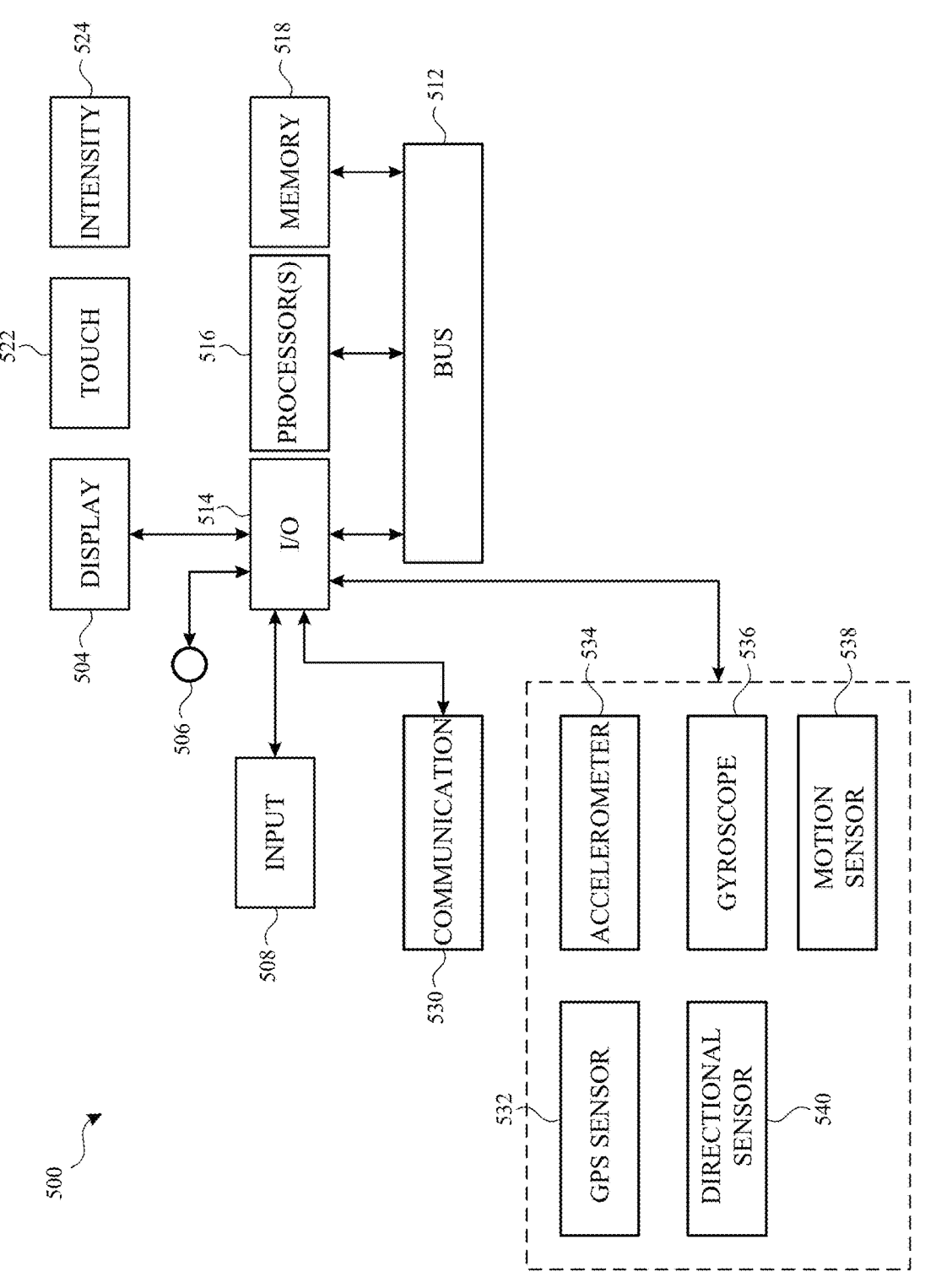
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or

500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6J illustrate examples of a representation of a digital card having a visual effect, in accordance with some embodiments. The examples in these figures are used to illustrate the processes described below, including the processes in FIGS. 7A-7B.

FIGS. 6A-6J depict examples of digital card 610, which can be displayed using device 600. Device 600 is portable multifunction device, such as a smartphone. In some embodiments, device 600 is a wearable device, such as a smartwatch. In the embodiments described herein, device 600 displays digital card 610, which is a student ID. However, it should be appreciated that a student ID is merely one example of a digital card that can be displayed using the techniques described herein. For example, the digital card can be used as a faculty ID, badge, or other type of digital card. In the embodiments described herein, device 600 receives data that includes assets that are to be displayed using digital card 610. In some embodiments, the assets are defined by a remote entity that is different from the entity that developed and/or provides device 600 and/or the operating system being run on device 600, and the data that includes the assets can be received from a server or computer system that is associated with the remote entity. In the example embodiments depicted in FIGS. 6A-6J, the assets are provided by a school called Lime University and include school logo 612-1, school seal 612-2, school name 612-3, design elements 612-4, and school color 616. In some embodiments, the assets provided by the school can include other visual assets such as artwork to be displayed on the digital card and other visual assets defined by the school.

Figure 6A:
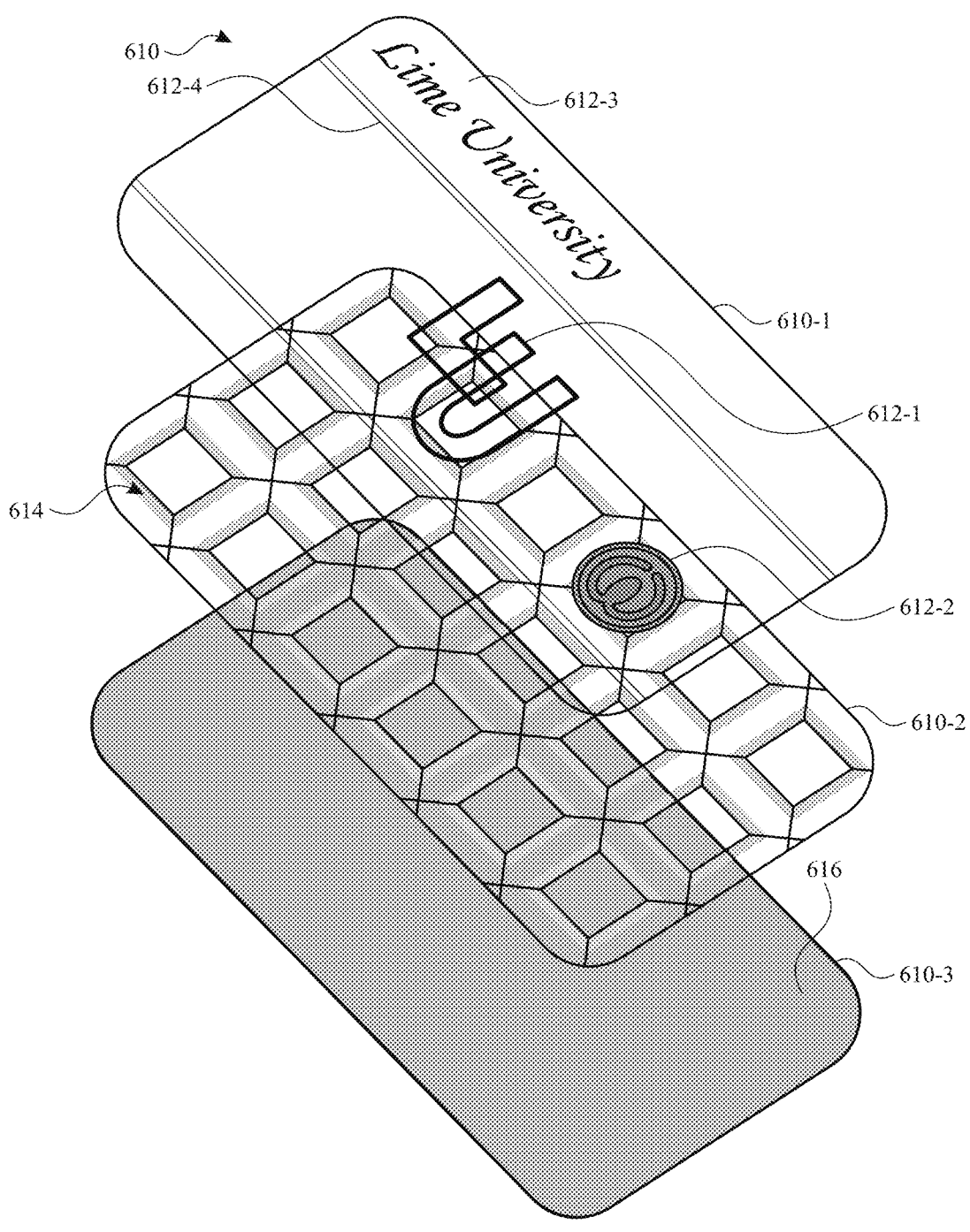
FIGS. 6A-6J illustrate examples of a representation of a digital card having a visual effect, in accordance with some embodiments.

FIG. 6A illustrates a layered structure for digital card 610. In some embodiments, digital card 610 includes three layers: 610-1, 610-2, and 610-3. Layer 610-1 is a top layer of the digital card that is displayed over layers 610-2 and 610-3. Layer 610-1 is assigned assets that are to be included on a displayed representation of digital card 610. Specifically, device 600 assigns school logo 612-1, school seal 612-2, school name 612-3, and design elements 612-4 to layer 610-1. In some embodiments, layer 610-1 is static and flat, and a visual effect is not applied to layer 610-1. In some embodiments, layer 610-1 provides a background region of a displayed representation of digital card 610 that includes other displayed assets such as school artwork and/or other visual elements such as gridlines.

Layer 610-2 is a middle layer of the digital card that is positioned below layer 610-1 and above layer 610-3. In some embodiments, layer 610-2 is at least partially transparent such that layer 610-3 is visible through layer 610-2. In the embodiment depicted in FIG. 6A, layer 610-2 includes three-dimensional mapping 614 (e.g., a normal map), which provides a three-dimensional texture to the layer and, in some embodiments, to elements that are visible through layer 610-2. In some embodiments, the three-dimensional mapping provides edges and surfaces for a simulated light to reflect and/or refract as part of providing a visual effect as described in greater detail below.

Layer 610-3 is a bottom or background layer displayed behind the other layers of digital card 610. In some embodiments, 610-3 is a single (e.g., uniform) color. In some embodiments, layer 610-3 includes a gradient of colors. In the embodiment depicted in FIG. 6A, layer 610-3 is assigned color 616, which is a visual asset assigned by the school. For example, color 616 is a school color for Lime University. In some embodiments, layer 610-3 is a color layer. In some embodiments, layer 610-3 includes a diffuse map.

As shown in FIG. 6A, the assets provided by the school are arranged on one or more layers of the digital card. Specifically, school logo 612-1, school seal 612-2, school name 612-3, and design elements 612-4 are assigned to layer 610-1, and school color 616 is assigned to layer 610-3. In some embodiments, although the assets themselves are provided by the school, the arrangement, sizing, positioning, shape, locations, and other visual characteristics of the assets are determined by device 600 and/or the operating system of device 600. For example, device 600 assigns school logo 612-1 to layer 610-1 as a cutout of the respective logo on layer 610-1, whereas school seal 612-2, school name 612-3, and design elements 612-4 are assigned as assets to be displayed on layer 610-1. By assigning school logo 612-1 as a cutout in layer 610-1, device 600 allows for layers beneath top layer 610-1 to be visible through the cutout of school logo 612-1. For example, middle layer 610-2 and bottom layer 610-3 are visible, thereby providing a window in layer 610-1 through which school color 616 and the visual effect can be viewed when digital card 610 is displayed. In some embodiments, one or more visual characteristics of the assets are modified when being assigned to the respective layer(s) of the digital card to optimize display of digital card 610 and to provide an optimized viewing experience. For example, in some embodiments, the size of school logo 612-1 is increased so that school color 616 and a visual effect (e.g., a metallic sheen) are more easily viewed through the cutout in the top layer on the displayed representation of digital card 610. As another example, device 600 slightly modifies school color 616 to provide a more visually pleasing appearance, particularly when the visual effect is applied.

Figure 6B:
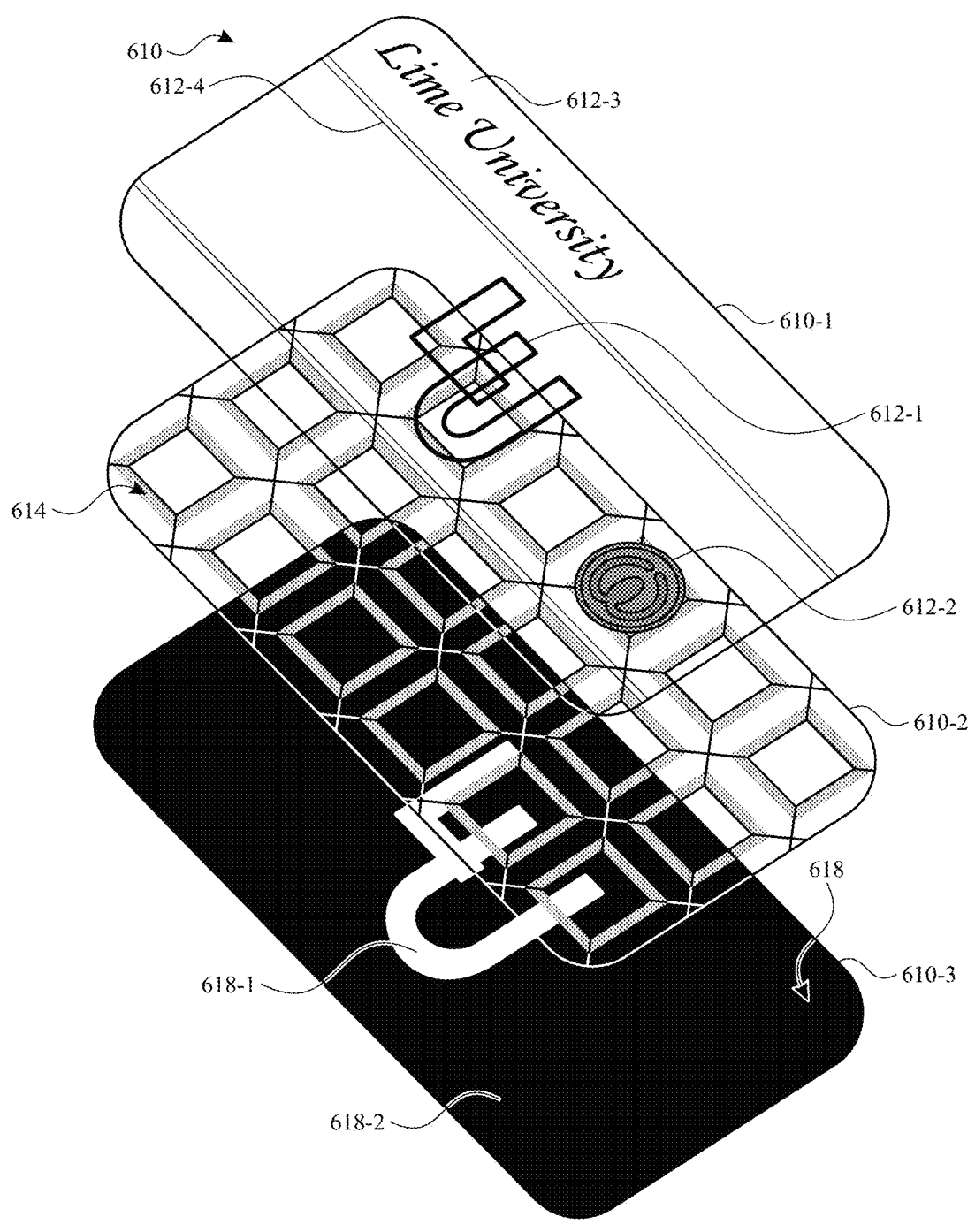

In some embodiments, device 600 applies one or more mappings to one or more layers of digital card 610. For example, as previously mentioned, device 600 applies three-dimensional mapping 614 to layer 610-2. As another example, device 600 applies a metal mapping (e.g., a metalness map) to layer 610-3, as shown in FIG. 6B. FIG. 6B depicts layer 610-3 having metal mapping 618 applied thereto. Metal mapping 618 defines regions of layer 610-3 that have properties of a metal such as, for example, a metallic appearance, reflectivity, and/or color. In the embodiment depicted in FIG. 6B, the metal mapping is shown with black and white coloring to indicate which regions have metal properties, but the black and white colors are not displayed as part of layer 610-3. For example, layer 610-3 still shows with color 616 when the digital card is displayed even though the metal mapping has been applied. Device 600 uses white coloring to indicate regions 618-1 of layer 610-3 that have metal properties and black coloring to indicate regions 618-2 of layer 610-3 that do not have metal properties. Device 600 applies white coloring at region 618-1, which is in a shape of the school logo asset and in a location within layer 610-3 that is visible through the cutout of school logo 612-1 in layer 610-1, when a representation of digital card 610 is displayed. Accordingly, metal mapping 618 determines that the school color 616 in region 618-1 of the background layer (e.g., layer 610-3) behind the school logo cutout in layer 610-1 has metallic properties, which, when combined with the other layers and after the processing described below, provide a metallic sheen visual effect for the displayed representation of digital card 610. In some embodiments, device 600 uses greyscale to indicate different degrees to which regions have metal properties (e.g., a metal effect or metallic effect).

In some embodiments, device 600 passes one or more layers of digital card 610 to a metal shader to generate the metallic sheen visual effect. In some embodiments, the device passes all layers of the digital card to the metal shader. In some embodiments, the device passes layer 610-2 and layer 610-3 to the metal shader (e.g., but not layer 610-1). In some embodiments, the device passes layer 610-2 (e.g., but not layer 610-1 and layer 610-3) or layer 610-3 (e.g., but not layer 610-1 and layer 610-2) to the metal shader. In some embodiments, the metal shader is an algorithm and/or application that applies a shading effect to a simulated metallic surface, such as region 618-1 in layer 610-3. In some embodiments, the metal shader generates simulated lighting that changes based on movement of device 600. In some embodiments, the simulated lighting includes a light source spotlight effect, which gives the appearance of light on the metallic surface being generated by a spotlight and provides a customized light fall-off effect (e.g., to increase the realism of the lighting effect across a range of colors, including, for example, black and yellow). In some embodiments, the simulated lighting includes increased grain to create a more realistic lighting effect. In some embodiments, the simulated lighting effect is combined with the metal mapping 614 in layer 610-2 to provide a customized metallic sheen visual effect where the simulated light moves across the metallic region 618-1 of color 616 and reflects and refracts off the edges and surfaces of the metal mapping 614. The movement of the simulated light is driven by movement of device 600 (e.g., a rotation matrix of the device). For example, as the device 600 rotates, angles, tilts, or turns, device 600 correspondingly adjusts the positioning, angle, and/or location of the simulated lighting based on the movement of device 600 to provide the metallic sheen across the metallic regions of the digital card, as described above.

FIGS. 6C-6J depict example user interfaces for displaying digital card 610 using device 600. Device 600 is a computer system that, in some embodiments, comprises touchscreen display 600a and other hardware such as processors, memory, camera(s) and other components for operating device 600 such as near-field circuitry and physical button 600b. Device 600 is depicted as a smartphone, however, it should be appreciated that the device can be a different type of computer system such as a tablet computer, smartwatch, laptop computer, or a head-mounted device. Device 600 can also include other input components such as a microphone for detecting audio input and/or other sensors for detecting finger gestures, hand gestures, eye gaze, and/or other inputs. In some embodiments, device 600 includes one or more elements of devices 100, 300, and/or 500.

Figures 6C, 6D:
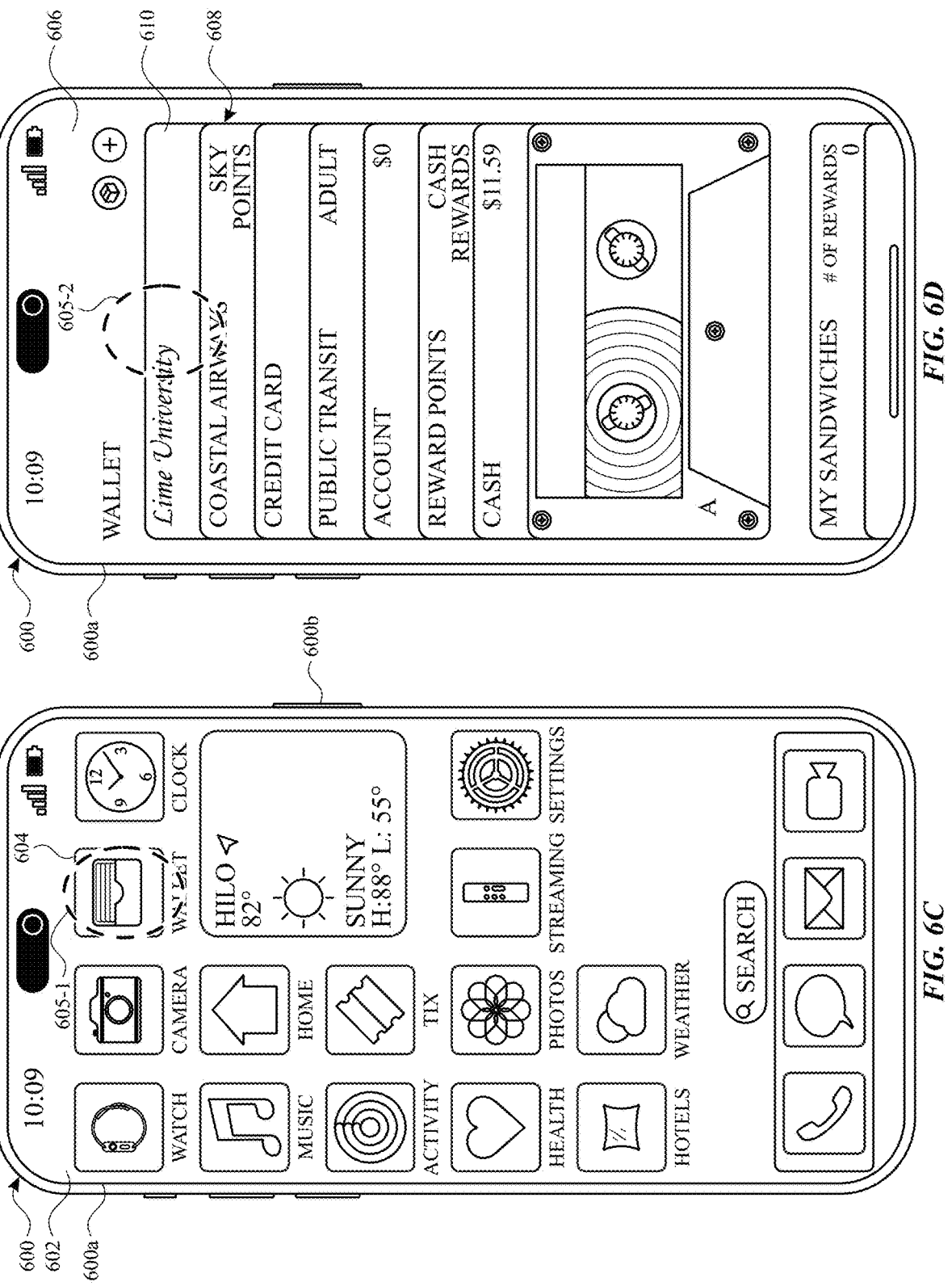

In FIG. 6C, device 600 displays, via display 600$a$, home screen interface 602, which includes application icons corresponding to different applications available at device 600. In response to detecting input 605-1 (e.g., a tap input, an air gesture, and/or a cursor input) selecting wallet application icon 604, device 600 displays wallet interface 606, as depicted in FIG. 6D. Wallet interface 606 includes credentials 608 for various accounts, which are stored at device 600. In some embodiments, the credentials can include identification cards, payment account cards, transit cards, and digital passes for events. In the embodiment depicted in FIG. 6D, the credentials include digital card 610, which is a student ID (e.g., a student identification card).

Figure 6E:
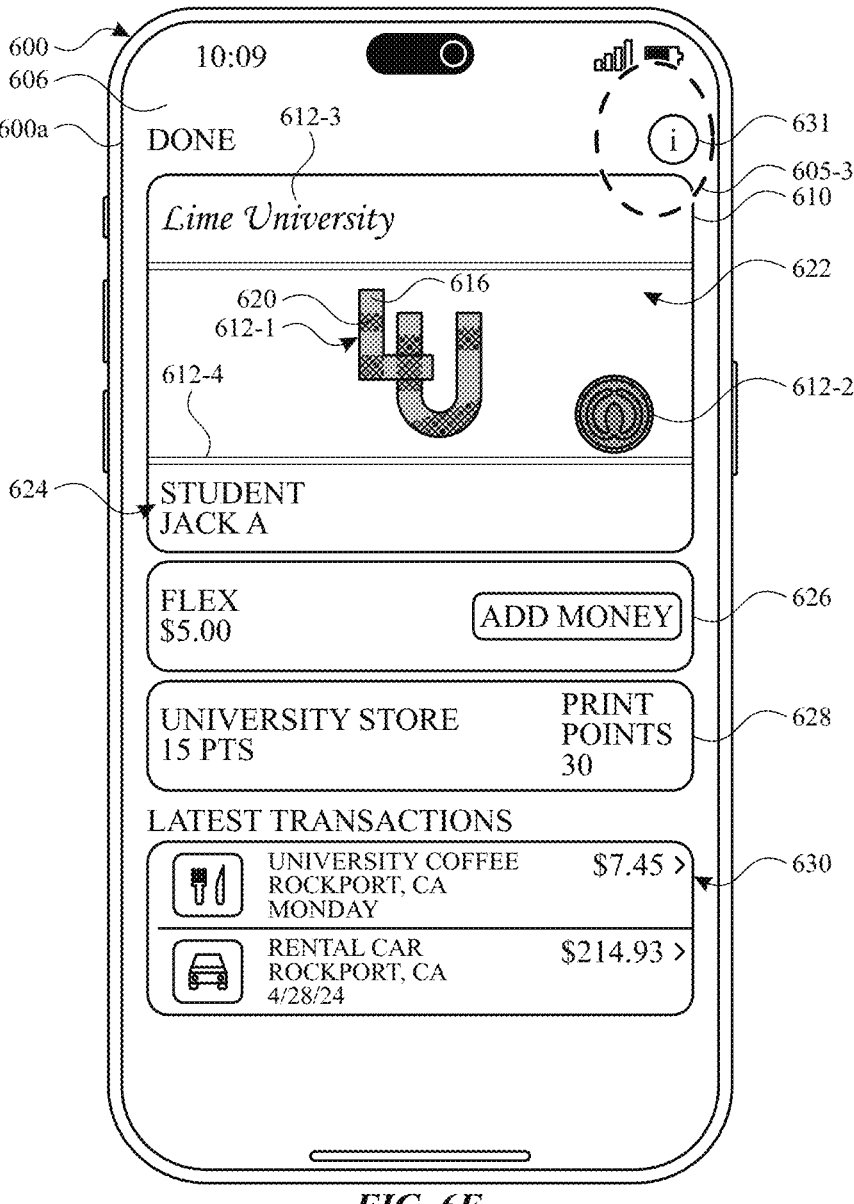

In response to detecting input 605-2 selecting digital card 610, device 600 displays wallet interface 606 with an expanded view of digital card 610, as shown in FIG. 6E. In FIG. 6E, layers 610-1, 610-2, and 610-3 (e.g., as shown in FIGS. 6A and 6B) are concurrently displayed overlaying one another to create digital card 610. The visual assets assigned to layer 610-1 and layer 610-3 are at least partially visible while the layers are concurrently displayed. For example, device 600 displays digital card 610 with school logo 612-1, school seal 612-2, school name 612-3, and design elements 612-4 as arranged on layer 610-1 and described above. Because school logo 612-1 is a cutout in layer 610-1 (and because layer 610-2 is at least partially transparent), color 616 in layer 610-3 is visible through the cutout in layer 610-1. Furthermore, device 600 displays the visual effect, represented by hatching 620 on color 616, which is the metallic sheen effect described above. The visual effect is also visible through the cutout in layer 610-1 and, therefore, appears as a metallic sheen displayed on color 616 in the cutout of school logo 612-1. Digital card 610 also includes background region 622, which is static and flat. The school seal 612-2, school name 612-3, and design elements 612-4 are displayed over background region 622. In some embodiments, the metallic sheen effect is not displayed on background region 622. In some embodiments, background region 622 includes other displayed assets such as school artwork and/or gridlines.

As device 600 moves (e.g., tilts, rotates, angles, and/or turns), device 600 detects the movement and modifies the visual effect based on the detected movement by moving, adjusting, increasing, decreasing, or otherwise changing the metallic sheen, as indicated by the changing locations of hatching 620 in the corresponding figures. For example, in FIG. 6F, device 600 is tilted approximately 45° to the left and hatching 620 moves across the school logo to simulate the movement of the metallic sheen across the logo based on the corresponding amount and direction of tilt of device 600. Similarly, in FIG. 6G, device 600 is tilted approximately 45° to the right and hatching 620 moves back across the school logo to simulate the movement of the metallic sheen across the logo based on the corresponding amount and direction of tilt of device 600.

In some embodiments, device 600 displays the student ID with additional information associated with the student's account. For example, referring again to FIG. 6E, device 600 displays digital card 610 with student information 624. As another example, device 600 displays platters 626, 628, and 630 below digital card 610. Platter 626 includes information for a student account balance. Platter 628 includes a university store points balance. Platter 630 contains a listing of transactions that are associated with the student account. In some embodiments, additional student account information is displayed on a "back side" view of the digital card. For example, in response to detecting input 605-3 selecting element 631, device 600 displays interface 632 showing a "back side" of digital card 610. Interface 632 includes element 634, which is selectable to access (e.g., download and/or open) an application that is associated with the school. Interface 632 also includes student information 636 such as the student's full name, the student's ID number, and school or major information. Interface 632 also includes school photo 638 of the student, hotline numbers 640, account balance elements 642, and account setting options 644.

In some embodiments, digital card 610 can be used to complete a transaction. For example, in response to detecting input 605-4 (e.g., a double-click input) on button 600$b$, device 600 is "armed" to use digital card 610 in a transaction as shown in FIG. 6I. In some embodiments, device 600 can be placed near a terminal, reader, or other near-field circuitry for scanning digital card 610 to initiate a transaction using the student ID. For example, the student ID can be used to gain access to a building, pay for merchandise such as food or books, present identification (e.g., as a student or faculty member), or for other purposes. In some embodiments, device 600 continues to provide the visual effect while digital card 610 is displayed for use in a transaction. For example, in FIG. 6J, device 600 is tilted forward and device 600 displays hatching 620 moving across the school logo to simulate the movement of the metallic sheen across the logo based on the corresponding amount and direction of tilt of device 600.

FIGS. 7A-7B are a flow diagram illustrating a method for displaying a representation of a digital card with a visual effect using a computer system, in accordance with some embodiments. Method 700 is performed at a computer system (e.g., 100, 300, 500, and/or 600) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more display generation components (e.g., 112, 340, 504, and/or display 600$a$) (e.g., a display controller, a touch-sensitive display, a display screen, a monitor, a projector, a holographic display, a head-mounted display system, and/or other device or component that presents visual content to a user, for example on or in the display generation component itself or produced from the display generation component and visible elsewhere) and one or more input devices (e.g., 112, 168, 350, 355, 508, 522, touch-sensitive surface of display 600$a$, and/or 600$b$) (e.g., a touch-sensitive surface, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units). Some operations in method 700 are, optionally, combined, the orders of some operations are, optionally, changed, and some operations are, optionally, omitted.

As described below, method 700 provides an intuitive way for displaying a representation of a digital card with a visual effect. The method reduces the cognitive burden on a user for using a digital card, thereby creating a more efficient human-machine interface. For battery-operated computing devices, enabling a user to display a representation of a digital card with a visual effect faster and more efficiently conserves power and increases the time between battery charges.

At method 700, after receiving (702) (e.g., via the one or more input devices and/or from an external computer system) first data corresponding to a digital card (e.g., 610) (e.g., a student identification card and/or a faculty identification badge) that is stored in an electronic wallet (e.g., 606) of the computer system (e.g., 600), wherein the first data includes a set of visual assets (e.g., 612-1, 612-2, 612-3, 612-4, and/or 616) (e.g., school graphics, school logo, artwork, color(s), and/or a school seal) defined by an entity (e.g., an institution of education, a school, a college, and/or a university) associated with an external computer system (e.g., an external computer system that sends the first data to the computer system), the computer system performs (e.g., conditionally performs) the following steps.

The computer system (e.g., 600) receives (704), via the one or more input devices (e.g., 600*a* and/or 600*b*), a request (e.g., 605-2 and/or 605-4) to display a representation of the digital card (e.g., 610). In response to receiving the request to display the representation of the digital card, the computer system displays (706), via the one or more display generation components (e.g., 600*a*), the representation of the digital card (e.g., 610) having a respective appearance that is based on the first data (e.g., including a representation of the school graphics, school logo, artwork, color(s), and/or school seal) and includes a visual effect (e.g., 620) (e.g., a metallic sheen effect) that changes (e.g., moves, appears, disappears, increases, and/or decreases) based on movement (e.g., tilt, rotation, turning, and/or angling) of the computer system. In some embodiments, the visual effect is a dynamic graphical effect that automatically changes appearance in response to detecting movement of the computer system.

As a part of displaying the representation of the digital card (e.g., 610) having the respective appearance that is based on the first data and includes the visual effect (e.g., 620) that changes based on movement of the computer system (e.g., 600), the computer system performs (e.g., conditionally performs) the following steps. In accordance with a determination that the first data includes a first set of visual assets (e.g., 612-1, 612-2, 612-3, 612-4, and/or 616) defined by the entity associated with the external computer system (e.g., the first data includes a first school graphic, artwork, color, and/or seal), the computer system displays (708) the representation of the digital card having a first appearance (e.g., 610 as shown in FIG. 6E and/or FIG. 6I) that includes a representation of the first set of visual assets (e.g., 612-1 and/or 616) having the visual effect (e.g., 620) applied to the first set of visual assets (e.g., a metallic sheen is applied to the first school graphic, artwork, color, and/or seal). In accordance with a determination that the first data includes a second set of visual assets that is different from the first set of visual assets and defined by the entity associated with the external computer system (e.g., the first data includes a second school graphic, artwork, color, and/or seal), the computer system displays (710) the representation of the digital card having a second appearance that is different from the first appearance and includes a representation of the second set of visual assets having the visual effect (e.g., 620) applied to the second set of visual assets (e.g., a metallic sheen is applied to the second school graphic, artwork, color, and/or seal).

Figures 6F, 6G:
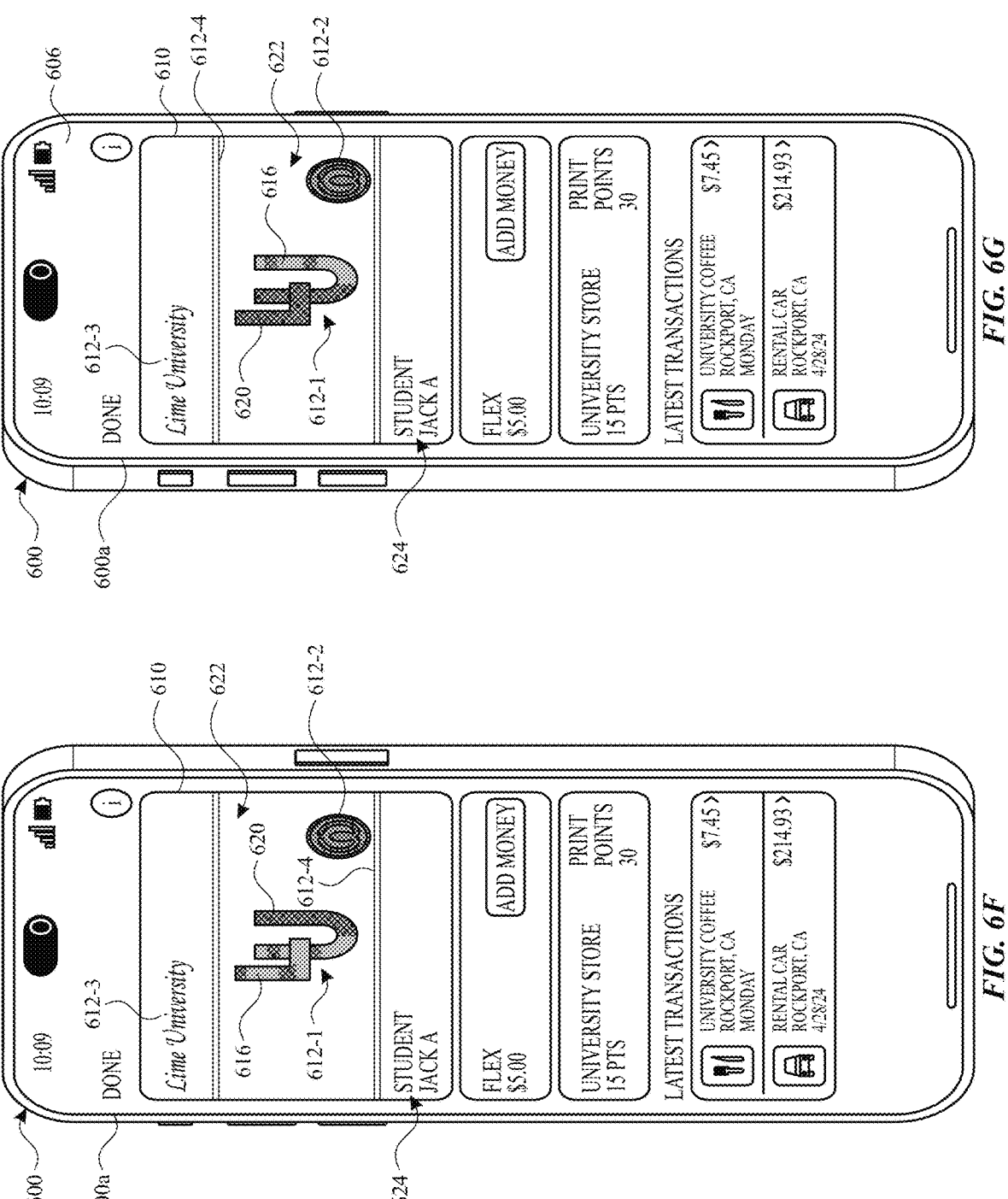
Figures 6H, 6I:
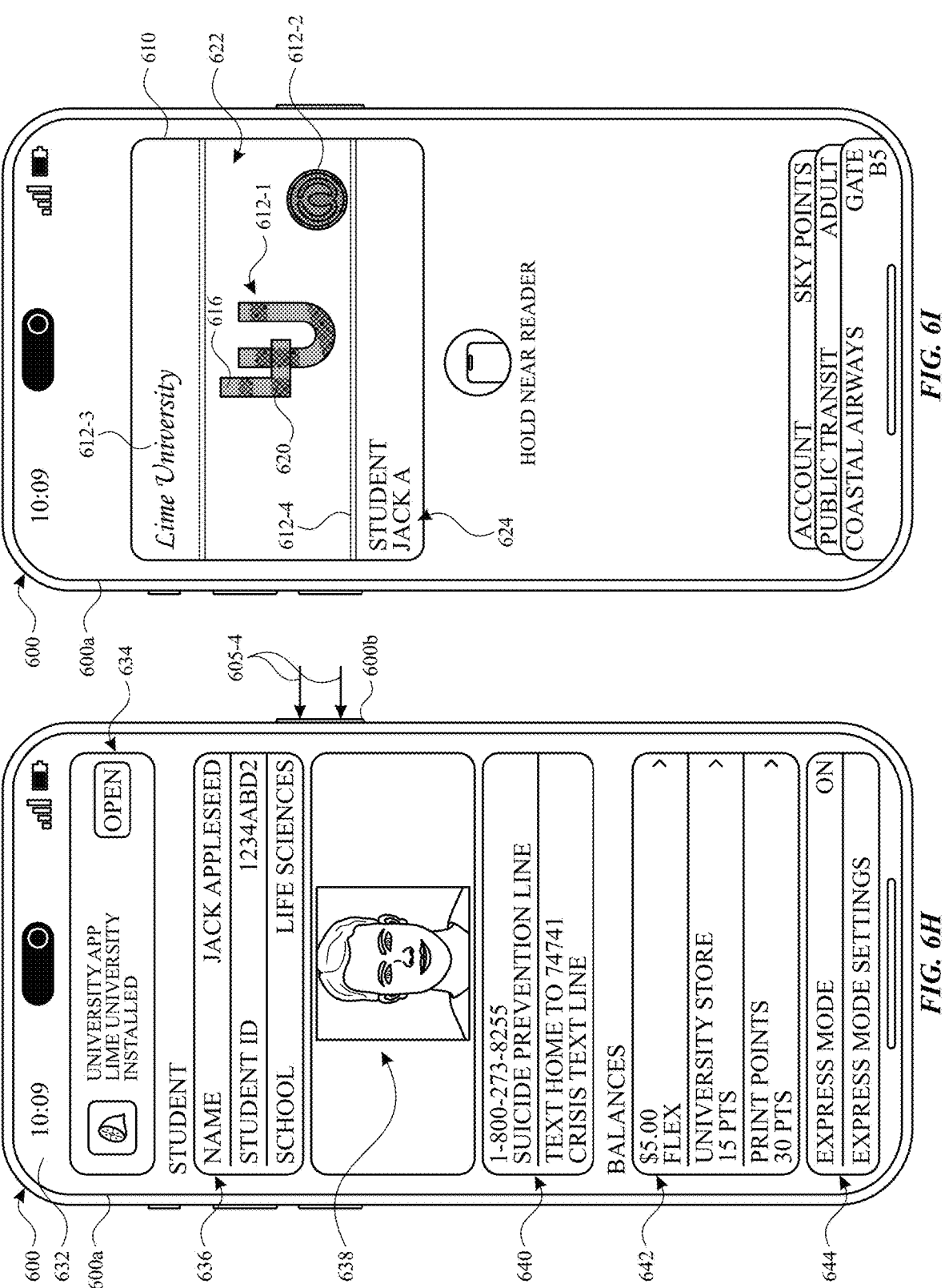
Figure 6J:
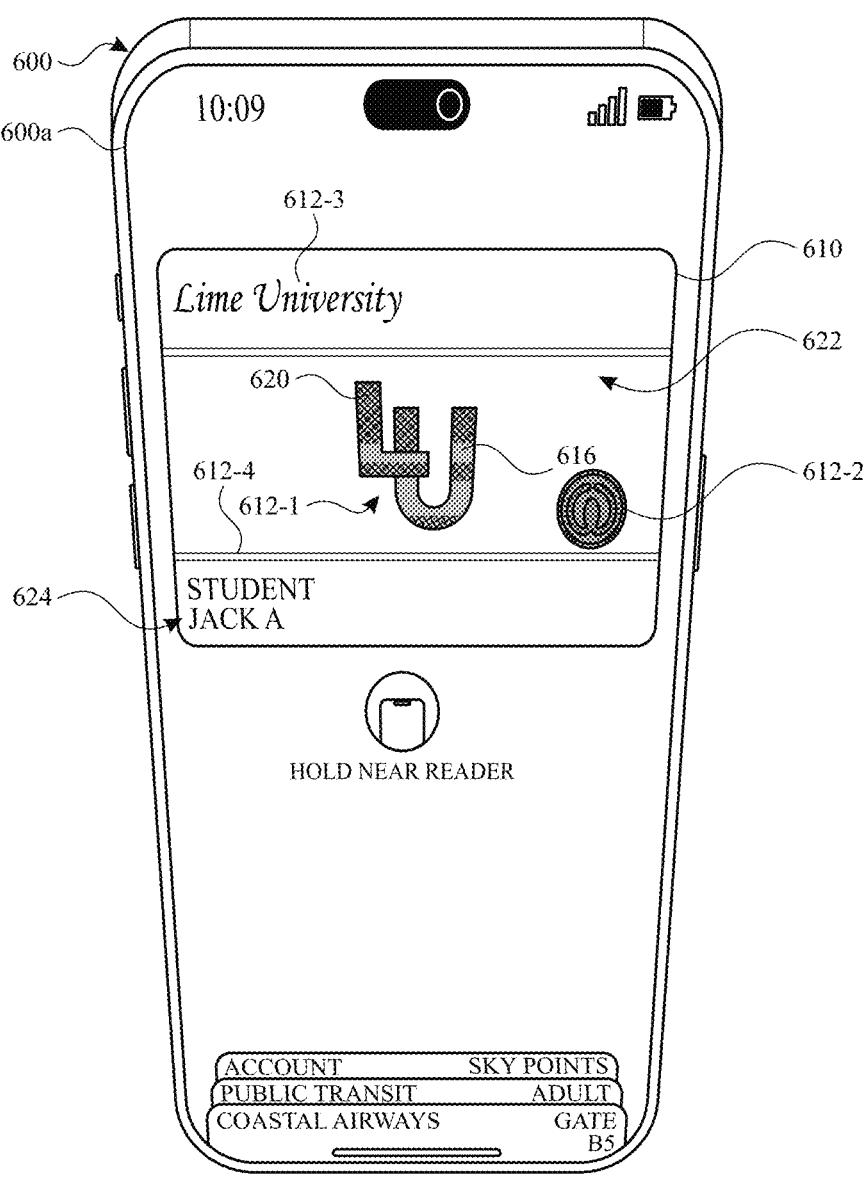

While displaying the representation of the digital card (e.g., 610) having the respective appearance (e.g., 610 as shown in FIG. 6E and/or FIG. 6I) that is based on the first data and includes the visual effect (e.g., 620) that changes based on movement of the computer system (e.g., 600), the computer system detects (712), via the one or more input devices (e.g., 168) (e.g., a gyroscope, accelerometer, and/or inertial measurement unit), movement (e.g., tilt, rotation, turning, and/or angling) of the computer system (e.g., as depicted in FIGS. 6F, 6G, and/or 6J).

In response to detecting the movement of the computer system (e.g., 600), the computer system updates (714) the respective appearance of the digital card (e.g., 610) to include a modification of the visual effect (e.g., 620) based on the detected movement of the computer system (e.g., the computer system adjusts the metallic sheen in response to the movement of the computer system). As a part of updating the respective appearance of the digital card to include a modification of the visual effect based on the detected movement of the computer system, the computer system performs (e.g., conditionally performs) the following steps. In accordance with a determination that the first data includes the first set of visual assets (e.g., 612-1, 612-2, 612-3, 612-4, and/or 616) defined by the entity associated with the external computer system, the computer system displays (716) the representation of the digital card (e.g., 610) having a third appearance (e.g., 610 as depicted in FIGS. 6F, 6G, and/or 6J) that is different from the first appearance (e.g., and different from the second appearance) and includes the representation of the first set of visual assets (e.g., 612-1 and/or 616) having the modified visual effect (e.g., 620) (e.g., the metallic sheen is moved, rearranged, partially removed, additional sheen is displayed, brightness is increased or decreased, and/or other visual modification is made to the metallic sheen) applied to the first set of visual assets (e.g., the metallic sheen that is applied to the first school graphic, artwork, color, and/or seal is modified based on the movement of the computer system). In accordance with a determination that the first data includes the second set of visual assets defined by the entity associated with the external computer system, the computer system displays (718) the representation of the digital card (e.g., 610) having a fourth appearance that is different from the second appearance (e.g., and different from the first appearance and the third appearance) and includes the representation of the second set of visual assets having the modified visual effect (e.g., 620) (e.g., the metallic sheen is moved, rearranged, partially removed, additional sheen is displayed, brightness is increased or decreased, and/or other visual modification is made to the metallic sheen) applied to the second set of visual assets (e.g., the metallic sheen that is applied to the second school graphic, artwork, color, and/or seal is modified based on the movement of the computer system). Displaying the representation of the digital card having the third appearance that includes the representation of the first set of visual assets having the modified visual effect applied to the first set of visual assets or having the fourth appearance that includes the representation of the second set of visual assets having the modified visual effect applied to the second set of visual assets based on whether the first data includes the first set of visual assets or the second set of visual assets defined by the entity associated with the external computer system provides visual feedback to the user that the representation of the digital card is authentic (e.g., a representation of a digital card without the visual effect that changes based on movement of the computer system may indicate that the card is fraudulent) and enhances security by making the representation of the digital card difficult to copy or counterfeit.

In some embodiments, one or more of the visual assets (e.g., 612-1, 612-2, 612-3, and/or 612-4) (e.g., school graphics, school logo, artwork, color(s), and/or a school seal) in the set of visual assets defined by the entity associated with the external computer system are arranged (e.g., placed, sized, oriented, and/or positioned) on a first layer (e.g., 610-1) (e.g., a top layer and/or a front layer) of the digital card (e.g., 610). Arranging one or more of the visual assets on the first layer of the digital card provides visual feedback to the user that the representation of the digital card is authentic (e.g., a representation of a digital card without the visual assets applied to the first layer may indicate that the card is fraudulent) and enhances security by making the representation of the digital card difficult to copy or counterfeit. In some embodiments, the first layer of the digital card is a top layer of the digital card. In some embodiments, one or more of the visual assets (e.g., 612-2, 612-3, and/or 612-4) are applied to (e.g., printed on, assigned to, and/or displayed on) the first layer of the card. In some embodiments, one or more of the visual assets (e.g., 612-1) are cut out of the first layer of the digital card (e.g., the visual assets are formed as negative space or a void in the first layer of the card).

In some embodiments, the visual effect includes a metallic sheen effect (e.g., 620) (e.g., a visual effect that includes visual characteristics that simulate movement of light across a metallic surface) that changes based on movement of the computer system (e.g., 600) (e.g., the movement of the computer system controls the simulated movement of light for the metallic sheen effect). Displaying the visual effect as a metallic sheen effect that changes based on movement of the computer system provides visual feedback to the user that the representation of the digital card is authentic (e.g., a representation of a digital card without the metallic sheen effect may indicate that the card is fraudulent) and enhances security by making the representation of the digital card difficult to copy or counterfeit. In some embodiments, the computer system displays the visual effect having a first metallic sheen appearance when the visual effect is applied to the first or second set of visual assets. In some embodiments, the computer system displays the visual effect having a second metallic sheen appearance that is different from the first metallic sheen appearance when the modified visual effect is applied to the first or second set of visual assets.

In some embodiments, after receiving the first data corresponding to the digital card (e.g., 610) (e.g., and prior to displaying the representation of the digital card), the computer system (e.g., 600) generates the visual effect (e.g., 620) using a metal shader (e.g., an algorithm and/or application that applies a shading effect to a simulated metallic surface). Generating the visual effect using a metal shader provides visual feedback to the user that the representation of the digital card is authentic (e.g., a representation of a digital card without the visual effect may indicate that the card is fraudulent) and enhances security by making the representation of the digital card difficult to copy or counterfeit. In some embodiments, the computer system uses a metal shader to generate the visual effect on the representation of the digital card.

In some embodiments, the metal shader generates simulated lighting (e.g., 620) that changes (e.g., moves and/or adjusts) in response to detected movement (e.g., tilt, rotation, turning, and/or angling) of the computer system (e.g., as depicted in FIGS. 6F, 6G, and/or 6J). Generating simulated lighting that changes in response to detected movement of the computer system provides visual feedback to the user that the representation of the digital card is authentic (e.g., a representation of a digital card without the simulated lighting may indicate that the card is fraudulent) and enhances security by making the representation of the digital card difficult to copy or counterfeit. In some embodiments, the simulated lighting imitates movement of light across a metallic surface to generate the visual effect (e.g., 620) (e.g., the metallic sheen). In some embodiments, movement of the simulated lighting is based on a detected amount of movement of the computer system. In some embodiments, in accordance with a determination that the computer system moves by a first amount of movement (e.g., a first magnitude and/or direction of rotation, tilt, turning, and/or angling) the computer system simulates movement of the simulated lighting by a first amount of movement (e.g., a first magnitude and/or direction of light movement); and in accordance with a determination that the computer system moves by a second amount of movement different from the first amount of movement (e.g., a second magnitude and/or direction of rotation, tilt, turning, and/or angling) the computer system simulates movement of the simulated lighting by a second amount of movement different from the first amount of movement (e.g., a second magnitude and/or direction of light movement). In some embodiments, the simulated lighting includes a light source spotlight effect (e.g., a visual effect in which a light is simulated on a surface as if the light is generated by a spotlight). Generating simulated lighting that includes a light source spotlight effect provides visual feedback to the user that the representation of the digital card is authentic (e.g., a representation of a digital card without the light source spotlight effect may indicate that the card is fraudulent) and enhances security by making the representation of the digital card difficult to copy or counterfeit. In some embodiments, the light source spotlight effect provides a customized light fall-off effect. In some embodiments, using a light source spotlight effect increases the realism of the lighting effect across a wide variety of colors (e.g., including black and yellow). In some embodiments, the simulated lighting includes increased grain to create a more realistic lighting effect.

In some embodiments, the digital card (e.g., 610) includes a second layer (e.g., 610-2) (e.g., a middle layer and/or an intervening layer) having a three-dimensional effect (e.g., 614) (e.g., a normal map and/or a three-dimensional mapping) and a third layer (e.g., 610-3) (e.g., a bottom layer and/or a back layer) having one or more colors (e.g., 616) (e.g., a diffuse map and/or one or more color assets). In some embodiments, the one or more colors is a color asset defined by the entity associated with the external computer system. In some embodiments, the computer system (e.g., 600) modifies the color asset to provide an appearance that is optimized for display at the computer system (e.g., a more visually appealing appearance on the displayed representation of the digital card). In some embodiments, after receiving the first data corresponding to the digital card (e.g., and prior to displaying the representation of the digital card), the computer system applies a map (e.g., 618) (e.g., a metalness map) that defines a metal value (e.g., 618-1 and/or 618-2) (e.g., a value that corresponds to a degree to which a surface has one or more properties, such as appearance, reflectivity and/or color, of a metal) to the third layer (e.g., 610-3) (e.g., applied to the diffuse map and/or one or more color assets) of the digital card. Applying a map that defines a metal value to the third layer of the digital card provides visual feedback to the user that the representation of the digital card is authentic (e.g., a representation of a digital card without the metallic effect may indicate that the card is fraudulent) and enhances security by making the representation of the digital card difficult to copy or counterfeit. In some embodiments, the computer system applies a metalness map to the third layer of the digital card. In some embodiments, the metalness map determines which portions or elements of the representation of the digital card have a metallic effect. In some embodiments, the computer system applies the metalness map with a first metal value (e.g., 618-1) assigned to a region of the third layer that corresponds to a visual asset (e.g., 612-1) (e.g., a school logo) in the set of visual assets and a second metal value (e.g., 618-2) assigned to a region of the third layer that does not correspond to a visual asset in the set of visual assets. In some embodiments, the first metal value indicates the corresponding region should have a metal effect (e.g., one or more properties, such as appearance, reflectivity, and/or color, of a metal) and the second metal value indicates the corresponding region should not have a metal effect. In some embodiments, the metalness map uses greyscale to indicate a degree to which regions have a metal effect. In some embodiments, the metalness map uses white to indicate which regions have a metal effect and black to indicate which regions do not have a metal effect. In some embodiments, after receiving the first data corresponding to the digital card (e.g., and prior to displaying the representation of the digital card), the computer system passes at least one of the second layer (e.g., 610-2) and the third layer (e.g., 610-3) to a metal shader to generate the visual effect (e.g., 620). Passing at least one of the second layer and the third layer to the metal shader to generate the visual effect provides visual feedback to the user that the representation of the digital card is authentic (e.g., a representation of a digital card without the visual effect may indicate that the card is fraudulent) and enhances security by making the representation of the digital card difficult to copy or counterfeit. In some embodiments, the computer system passes the second layer and/or the third layer to a metal shader to generate the visual effect. In some embodiments, the computer system passes all three layers to the metal shader to generate the visual effect.

In some embodiments, the entity associated with the external computer system is a school (e.g., an institution of education, a school, a college, and/or a university). In some embodiments, the visual assets in the set of visual assets are defined by a school. In some embodiments, the set of visual assets (e.g., 612-1, 612-2, 612-3, 612-4, and/or 616) includes one or more items from a group that includes: a school logo (e.g., 612-1), a school seal (e.g., 612-2), and a school color (e.g., 616). In some embodiments, the visual assets include a school logo, a school seal, and/or one or more school colors. In some embodiments, the visual assets include other content such as, for example, school artwork, design elements (e.g., 612-4), and/or a school name (e.g., 612-3).

In some embodiments, after receiving the first data corresponding to the digital card (e.g., 610) (e.g., and prior to displaying the representation of the digital card), the computer system (e.g., 600) modifies one or more visual assets in the set of visual assets (e.g., 612-1, 612-2, 612-3, 612-4, and/or 616). In some embodiments, as a part of modifying one or more visual assets in the set of visual assets, the computer system performs (e.g., conditionally performs) the following steps. In accordance with a determination that a set of criteria is met (e.g., criteria that determines whether a visual asset is optimized for display at the computer system), the computer system modifies a first visual asset from a first defined appearance (e.g., an appearance defined by the entity associated with the external computer system) (e.g., a first color, shape, and/or size) to a second defined appearance (e.g., a different color, shape, and/or size) that is different from the first defined appearance (e.g., an appearance defined by the computer system and optimized for display at the computer system). In accordance with a determination that the set of criteria is not met (e.g., the visual asset is optimized for display at the computer system), the computer system modifies the one or more visual assets in the set of visual assets without modifying the first visual asset from the first defined appearance to the second defined appearance (e.g., maintaining the appearance defined by the entity associated with the external computer system). Modifying the first visual asset from the first defined appearance to the second defined appearance when the set of criteria is met provides visual feedback to the user that the representation of the digital card is authentic (e.g., a representation of a digital card without a visual asset that meets respective criteria may indicate that the card is fraudulent) and enhances security by making the representation of the digital card difficult to copy or counterfeit. In some embodiments, the computer system modifies a visual asset that was defined by the entity associated with the external computer system if the visual asset is not optimized for display at the computer system.

In some embodiments, the representation of the digital card (e.g., 610) includes a background region (e.g., 622) that does not include the visual effect (e.g., 620) that changes based on movement of the computer system (e.g., 600). Displaying the representation of the digital card including a background region that does not include the visual effect provides visual feedback to the user that the representation of the digital card is authentic (e.g., a representation of a digital card without the background region that does not include the visual effect may indicate that the card is fraudulent) and enhances security by making the representation of the digital card difficult to copy or counterfeit. In some embodiments, the digital card includes a background that is flat and/or static. In some embodiments, the background region is provided on a top layer (e.g., 610-1) (e.g., the first layer and/or the cutout layer) of the digital card. In some embodiments, the background region of the representation of the digital card includes gridlines. In some embodiments, the gridlines are static and do not change based on movement of the computer system. In some embodiments, the representation of the digital card provides a lenticular effect or simulated three-dimensional effect that is applied to the displayed representation of the digital card.

In some embodiments, the representation of the digital card (e.g., 610) includes a student name (e.g., 624). In some embodiments, other identifying information for the student such as a student photo (e.g., 638), student identification number (e.g., 636), or other information is displayed in a user interface (e.g., 632) that includes a detailed view of the student ID (e.g., 610). In some embodiments, the detailed view of the student ID includes an option (e.g., 634) to access an application that is designed for the student's school, student information (e.g., 636) such as name, ID number, and school/major name, hotline numbers (e.g., 640), account balances (e.g., 642), and settings (e.g., 644) associated with the student ID. In some embodiments, the computer system (e.g., 600) displays student account balances in platters (e.g., 626 and/or 628) below (e.g., not on) the representation of the digital card (e.g., 610). In some embodiments, the computer system displays student account balance information below the representation of the digital card. In some embodiments, the digital card is used for a faculty badge. In some embodiments, the digital card can be used in a transaction (e.g., via scanning at a terminal) such as, for example, to gain access to a building, to pay for merchandise such as food or books, to present identification (e.g., as a student or faculty member), or for other purposes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display a representation of a digital card. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, student ID numbers, or any other identifying or personal information.

The present disclosure recognizes that the use of such personal information data, in the present technology, can be used to the benefit of users. For example, the personal information data can be used to display a representation of a digital card with targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of digital student ID cards, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a representation of a digital student ID card can be displayed with redacted personal information or a bare minimum amount of personal information, such as the content being requested by the device associated with a user, other non-personal information available to the computer system, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

after receiving first data corresponding to a digital card that is stored in an electronic wallet of the computer system, wherein the first data includes a set of visual assets defined by an entity associated with an external computer system:

receiving, via the one or more input devices, a request to display a representation of the digital card;

in response to receiving the request to display the representation of the digital card, displaying, via the one or more display generation components, the representation of the digital card having a respective appearance that is based on the first data and includes a visual effect that changes based on movement of the computer system, including:

in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets;

while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including:

in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

2. The computer system of claim 1, wherein one or more of the visual assets in the set of visual assets defined by the entity associated with the external computer system are arranged on a first layer of the digital card.

3. The computer system of claim 1, wherein the visual effect includes a metallic sheen effect that changes based on movement of the computer system.

4. The computer system of claim 1, the one or more programs further including instructions for:

after receiving the first data corresponding to the digital card, generating the visual effect using a metal shader.

5. The computer system of claim 4, wherein the metal shader generates simulated lighting that changes in response to detected movement of the computer system.

6. The computer system of claim 5, wherein the simulated lighting includes a light source spotlight effect.

7. The computer system of claim 1, wherein the digital card includes a second layer having a three-dimensional effect and a third layer having one or more colors.

8. The computer system of claim 7, the one or more programs further including instructions for:

after receiving the first data corresponding to the digital card, applying a map that defines a metal value to the third layer of the digital card.

9. The computer system of claim 7, the one or more programs further including instructions for:

after receiving the first data corresponding to the digital card, passing at least one of the second layer and the third layer to a metal shader to generate the visual effect.

10. The computer system of claim 1, wherein the entity associated with the external computer system is a school.

11. The computer system of claim 10, wherein the set of visual assets includes one or more items from a group that includes: a school logo, a school seal, and a school color.

12. The computer system of claim 1, the one or more programs further including instructions for:

after receiving the first data corresponding to the digital card, modifying one or more visual assets in the set of visual assets, including:

in accordance with a determination that a set of criteria is met, modifying a first visual asset from a first defined appearance to a second defined appearance that is different from the first defined appearance; and in accordance with a determination that the set of criteria is not met, modifying the one or more visual assets in the set of visual assets without modifying the first visual asset from the first defined appearance to the second defined appearance.

13. The computer system of claim 1, wherein the representation of the digital card includes a background region that does not include the visual effect that changes based on movement of the computer system.

14. The computer system of claim 13, wherein the background region of the representation of the digital card includes gridlines.

15. A non-transitory computer-readable storage medium storing one or more programs configured to be executed by one or more processors of a computer system that is in communication with a display generation component and one or more input devices, the one or more programs including instructions for:

after receiving first data corresponding to a digital card that is stored in an electronic wallet of the computer system, wherein the first data includes a set of visual assets defined by an entity associated with an external computer system:

receiving, via the one or more input devices, a request to display a representation of the digital card;

in response to receiving the request to display the representation of the digital card, displaying, via the one or more display generation components, the representation of the digital card having a respective appearance that is based on the first data and includes a visual effect that changes based on movement of the computer system, including:

in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets;

while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including:

in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

16. The non-transitory computer-readable storage medium of claim 15, wherein one or more of the visual assets in the set of visual assets defined by the entity associated with the external computer system are arranged on a first layer of the digital card.

17. The non-transitory computer-readable storage medium of claim 15, wherein the visual effect includes a metallic sheen effect that changes based on movement of the computer system.

18. The non-transitory computer-readable storage medium of claim 15, the one or more programs further including instructions for:

after receiving the first data corresponding to the digital card, generating the visual effect using a metal shader.

19. The non-transitory computer-readable storage medium of claim 18, wherein the metal shader generates simulated lighting that changes in response to detected movement of the computer system.

20. The non-transitory computer-readable storage medium of claim 19, wherein the simulated lighting includes a light source spotlight effect.

21. The non-transitory computer-readable storage medium of claim 15, wherein the digital card includes a second layer having a three-dimensional effect and a third layer having one or more colors.

22. The non-transitory computer-readable storage medium of claim 21, the one or more programs further including instructions for:

after receiving the first data corresponding to the digital card, applying a map that defines a metal value to the third layer of the digital card.

23. The non-transitory computer-readable storage medium of claim 21, the one or more programs further including instructions for:

after receiving the first data corresponding to the digital card, passing at least one of the second layer and the third layer to a metal shader to generate the visual effect.

24. The non-transitory computer-readable storage medium of claim 15, wherein the entity associated with the external computer system is a school.

25. The non-transitory computer-readable storage medium of claim 24, wherein the set of visual assets includes one or more items from a group that includes: a school logo, a school seal, and a school color.

26. The non-transitory computer-readable storage medium of claim 15, the one or more programs further including instructions for:

after receiving the first data corresponding to the digital card, modifying one or more visual assets in the set of visual assets, including:

in accordance with a determination that a set of criteria is met, modifying a first visual asset from a first defined appearance to a second defined appearance that is different from the first defined appearance; and in accordance with a determination that the set of criteria is not met, modifying the one or more visual assets in the set of visual assets without modifying the first visual asset from the first defined appearance to the second defined appearance.

27. The non-transitory computer-readable storage medium of claim 15, wherein the representation of the digital card includes a background region that does not include the visual effect that changes based on movement of the computer system.

28. The non-transitory computer-readable storage medium of claim 27, wherein the background region of the representation of the digital card includes gridlines.

29. A method, comprising:

at a computer system that is in communication with one or more display generation components and one or more input devices:

after receiving first data corresponding to a digital card that is stored in an electronic wallet of the computer system, wherein the first data includes a set of visual assets defined by an entity associated with an external computer system:

receiving, via the one or more input devices, a request to display a representation of the digital card;

in response to receiving the request to display the representation of the digital card, displaying, via the one or more display generation components, the representation of the digital card having a respective appearance that is based on the first data and includes a visual effect that changes based on movement of the computer system, including:

in accordance with a determination that the first data includes a first set of visual assets defined by the entity associated with the external computer system, displaying the representation of the digital card having a first appearance that includes a representation of the first set of visual assets having the visual effect applied to the first set of visual assets; and in accordance with a determination that the first data includes a second set of visual assets that is different from the first set of visual assets and defined by the entity associated with the external computer system, displaying the representation of the digital card having a second appearance that is different from the first appearance and includes a representation of the second set of visual assets having the visual effect applied to the second set of visual assets;

while displaying the representation of the digital card having the respective appearance that is based on the first data and includes the visual effect that changes based on movement of the computer system, detecting, via the one or more input devices, movement of the computer system; and in response to detecting the movement of the computer system, updating the respective appearance of the digital card to include a modification of the visual effect based on the detected movement of the computer system, including:

in accordance with a determination that the first data includes the first set of visual assets defined by the entity associated with the external computer system, displaying the representation of the digital card having a third appearance that is different from the first appearance and includes the representation of the first set of visual assets having the modified visual effect applied to the first set of visual assets; and in accordance with a determination that the first data includes the second set of visual assets defined by the entity associated with the external computer system, displaying the representation of the digital card having a fourth appearance that is different from the second appearance and includes the representation of the second set of visual assets having the modified visual effect applied to the second set of visual assets.

30. The method of claim 29, wherein one or more of the visual assets in the set of visual assets defined by the entity associated with the external computer system are arranged on a first layer of the digital card.

31. The method of claim 29, wherein the visual effect includes a metallic sheen effect that changes based on movement of the computer system.

32. The method of claim 29, further comprising:

after receiving the first data corresponding to the digital card, generating the visual effect using a metal shader.

33. The method of claim 32, wherein the metal shader generates simulated lighting that changes in response to detected movement of the computer system.

34. The method of claim 33, wherein the simulated lighting includes a light source spotlight effect.

35. The method of claim 29, wherein the digital card includes a second layer having a three-dimensional effect and a third layer having one or more colors.

36. The method of claim 35, further comprising:

after receiving the first data corresponding to the digital card, applying a map that defines a metal value to the third layer of the digital card.

37. The method of claim 35, further comprising:

after receiving the first data corresponding to the digital card, passing at least one of the second layer and the third layer to a metal shader to generate the visual effect.

38. The method of claim 29, wherein the entity associated with the external computer system is a school.

39. The method of claim 38, wherein the set of visual assets includes one or more items from a group that includes: a school logo, a school seal, and a school color.

40. The method of claim 29, further comprising:

after receiving the first data corresponding to the digital card, modifying one or more visual assets in the set of visual assets, including:

in accordance with a determination that a set of criteria is met, modifying a first visual asset from a first defined appearance to a second defined appearance that is different from the first defined appearance; and in accordance with a determination that the set of criteria is not met, modifying the one or more visual assets in the set of visual assets without modifying the first visual asset from the first defined appearance to the second defined appearance.

41. The method of claim 29, wherein the representation of the digital card includes a background region that does not include the visual effect that changes based on movement of the computer system.

42. The method of claim 41, wherein the background region of the representation of the digital card includes gridlines.

* * * * *